United States Patent
Suzuki et al.

(10) Patent No.: US 7,378,984 B2
(45) Date of Patent: May 27, 2008

(54) AUDIO VISUAL SYSTEM

(75) Inventors: Hidekazu Suzuki, Yamatokoriyama (JP); Yutaka Nio, Osaka (JP); Masazumi Yamada, Osaka (JP); Koichiro Nagata, Ibaraki (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 336 days.

(21) Appl. No.: 10/732,305

(22) Filed: Dec. 11, 2003

(65) Prior Publication Data

US 2004/0143847 A1    Jul. 22, 2004

(30) Foreign Application Priority Data

Dec. 11, 2002  (JP)  ............................. 2002-359065
Dec. 9, 2003   (JP)  ............................. 2003-410250

(51) Int. Cl.
*H04N 7/173* (2006.01)

(52) U.S. Cl. ..................... 340/825.69; 340/825.24; 725/61; 348/734

(58) Field of Classification Search .......... 340/825.69, 340/825.72, 825.24, 825.25; 348/705, 734, 348/706; 341/176; 398/111–112; 370/450
See application file for complete search history.

(56) References Cited

U.S. PATENT DOCUMENTS 4,337,480 A * 6/1982 Bourassin et al. .......... 348/552
4,808,992 A * 2/1989 Beyers et al. .......... 340/825.24
4,817,203 A * 3/1989 Tsurumoto et al. .......... 398/106
5,204,662 A * 4/1993 Oda et al. .............. 340/825.25
5,402,183 A * 3/1995 Tanaka ...................... 348/705
5,488,357 A * 1/1996 Sato et al. ............. 340/825.25
5,550,826 A * 8/1996 Tanaka et al. ............... 370/450
6,292,230 B1 * 9/2001 Shui et al. .................. 348/705
6,400,280 B1 * 6/2002 Osakabe ................ 340/825.25
6,871,005 B1 * 3/2005 Han et al. ...................... 386/68
6,961,099 B2 * 11/2005 Takano et al. .............. 348/705
2002/0089427 A1 * 7/2002 Aratani et al. ......... 340/825.72

FOREIGN PATENT DOCUMENTS

| JP | 5-83646    | 4/1993 |
| JP | 7-75029    | 3/1995 |
| JP | 2002-78040 | 3/2002 |
| JP | 2002-271703| 9/2002 |

* cited by examiner

Primary Examiner—Edwin C. Holloway, III
(74) Attorney, Agent, or Firm—Wenderoth, Lind & Ponack, LLP

(57) ABSTRACT

On a display (100) end, maker codes and device codes are read from all STBs (110~112) connected to the display (100) to create a connected-device table. When a user presses a button on a remote controller, the display receives a remote control code outputted from the remote controller, searches the connected-device table for a maker code and a device code that match the maker code and the device code included in the remote control code, controls a selector (105) so that a reception interface that is connected to an STB whose maker code and device code match those included in the remote control code is connected to a display section (102), thereby to display AV data transmitted from the STB on the display section (102).

24 Claims, 31 Drawing Sheets

Fig.5
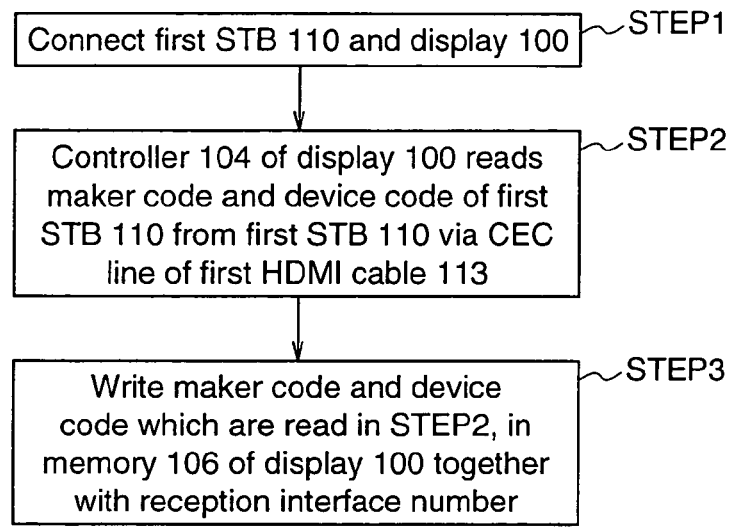
Fig.6
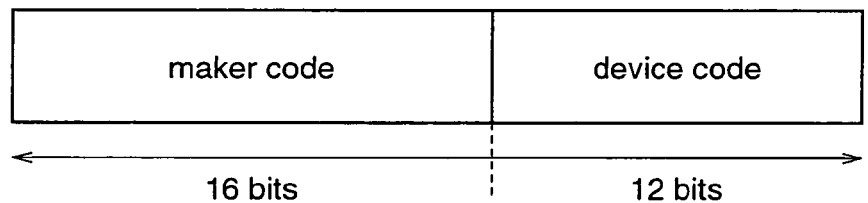
Fig.7
| reception interface No. | maker code | device code |
|---|---|---|
| 1 | maker_code_1 | kiki_code_1 |
| 2 | maker_code_2 | kiki_code_2 |
| 3 | maker_code_3 | kiki_code_3 |

Fig.18

| physical address | vender ID | device address |
|---|---|---|
| 1 | vendor_id_1 | kiki_addr_1 |
| 2 | vendor_id_2 | kiki_addr_2 |
| 3 | vendor_id_3 | kiki_addr_3 |

Fig.19

| maker code | vender ID |
|---|---|
| maker_code_1 | vendor_id_1 |
| maker_code_2 | vendor_id_2 |
| maker_code_3 | vendor_id_3 |

Fig.20

| device code | device address |
|---|---|
| kiki_code_1 | kiki_addr_1<br>kiki_addr_5<br>kiki_addr_6 |
| kiki_code_2 | kiki_addr_2<br>kiki_addr_7 |
| kiki_code_3<br>kiki_code_4 | kiki_addr_3 |

| device address | physical address | switching disable command |
|---|---|---|
| kiki_addr_1 | phy_addr_1 | disable command 1-1<br>disable command 1-2<br>disable command 1-3 |
| kiki_addr_2 | phy_addr_2 | disable command 2-1<br>disable command 2-2 |
| kiki_addr_3 | phy_addr_3 | disable command 3-1<br>disable command 3-2<br>disable command 3-3 |

Fig.36

| device address | physical address | switching enable command |
|---|---|---|
| kiki_addr_1 | phy_addr_1 | enable command 1-1<br>enable command 1-2<br>enable command 1-3 |
| kiki_addr_2 | phy_addr_2 | enable command 2-1<br>enable command 2-2 |
| kiki_addr_3 | phy_addr_3 | enable command 3-1<br>enable command 3-2<br>enable command 3-3 |

US 7,378,984 B2

AUDIO VISUAL SYSTEM

FIELD OF THE INVENTION

The present invention relates to an audio visual system (hereinafter referred to as an "AV system") for performing remote control operations using remote controllers corresponding to plural AV devices, when desired AV devices, such as STBs (Set Top Boxes), DVD (Digital Versatile Disk) players, DVD recorders, and VTRs, are connected to a display.

BACKGROUND OF THE INVENTION

FIG. 37 shows the construction of a conventional AV switcher (refer to Japanese Published Patent Application No. Hei.5-83646).

In FIG. 37, reference numeral 1 denotes an AV switcher, numeral 2 denotes a key operation unit, numeral 3 denotes a light-receptive unit for receiving an optical remote control signal, numeral 4 denotes a waveform shaping circuit, numeral 5 denotes an EEPROM for holding the remote control signal, numeral 6 denotes a CPU, numerals 7~10 denote N pieces of light-emitting units for converting the remote control signals outputted from the CPU 6 into infrared remote control signals of predetermined levels, respectively, and numerals 11~14 denote output terminals for optical fiber cables which are provided correspondingly to the respective light-emitting units 7~10. Further, reference numerals 15~18 denote optical fiber cables for transmitting the infrared rays to light-receptive units of plural AV devices (not shown), numerals 19~21 denote signal (video/audio) input terminals, numeral 22 denotes a switching circuit for outputting a required signal according to a switching signal 23 supplied from the CPU 6, numeral 24 denotes an output terminal for outputting the signal selected by the switching circuit 22, and numeral 26 denotes a remote controller corresponding to one of the AV devices constituting this system.

In this prior art, when a VTR is connected to the terminal 19, the switching circuit 22 is placed at a position A by manual operation to connect a signal from the VTR to the output terminal 24. Further, the user must operate the remote controller aiming at the AV switcher 1.

In the prior art, there is an inconvenience that, in the system construction where the plural AV devices are connected to the display via the AV switcher, the user must operate the remote controller corresponding to one of the AV devices to manually select the AV device while aiming the remote controller at the AV switcher. On the other hand, the user is apt to operate the remote controller of the AV device connected to the display while aiming the remote controller at the display. Therefore, when the AV device and the display are placed apart from each other, remote control does not effectively work if the user operates the remote controller aiming at the display.

SUMMARY OF THE INVENTION

The present invention is made to solve the above-described problems and has for its object to provide an AV system which, comprising a display unit and a plurality of AV devices connected to the display unit, enables remote control of each video device while aiming a remote controller at the display unit.

Other objects and advantages of the invention will become apparent from the detailed description that follows.

The detailed description and specific embodiments described are provided only for illustration since various additions and modifications within the scope of the invention will be apparent to those of skill in the art from the detailed description.

According to a first aspect of the present invention, there is provided an audio visual system comprising a display unit, a plurality of video devices connected to the display unit, and remote controllers for controlling the respective video devices, wherein one of the remote controllers transmits a remote control code to the display unit; and the display unit connects one of the plural video devices, which corresponds to the remote controller, to a display section of the display unit according to the remote control code transmitted from the remote controller. Therefore, it is possible to operate a remote controller associated with each video device while aiming the same at a display, and thereby automatically select the video device corresponding to the remote controller.

According to a second aspect of the present invention, there is provided an audio visual system comprising a display unit, a plurality of video devices connected to the display unit, and remote controllers for controlling the respective video devices, wherein one of the remote controllers transmits a remote control code to the display unit; the display unit adds a header to the remote control code transmitted from the remote controller, and transmits the remote control code to the respective video devices in unison; and each of the video devices checks as to whether the remote control code is directed to itself or not on the basis of maker ID information or device ID information that is included in the remote control code transmitted from the display unit, and instructs the display unit to connect itself to a display section of the display unit when the video device decides that the remote control code is directed to itself. Therefore, it is possible to operate a remote controller associated with each video device while aiming the same at a display, and thereby automatically select the video device corresponding to the remote controller.

According to a third aspect of the present invention, there is provided an audio visual system comprising a display unit, a plurality of video devices connected to the display unit, and remote controllers for controlling the respective video devices, wherein one of the remote controllers transmits a remote control code to the display unit; the display unit adds a header to the remote control code transmitted from the remote controller, and transmits the remote control code to the respective video devices in unison; and each of the video devices checks as to whether the remote control code is directed to itself or not on the basis of a device address that is included in the header of the signal received from the display unit, and operates according to a remote control command that is included in the remote control code of the output signal from the display unit when the video device decides that the remote control code is directed to itself. Therefore, it is possible to operate a remote controller associated with each video device while aiming the same at a display, and thereby easily operate the video device corresponding to the remote controller.

According to a fourth aspect of the present invention, there is provided an audio visual system comprising a display unit, a plurality of video devices connected to the display unit, and remote controllers for controlling the respective video devices, wherein one of the remote controllers transmits a remote control code to the display unit; the display unit adds a header to the remote control code transmitted from the remote controller, and transmits the remote control code to the respective video devices in unison; and each of the video devices checks as to whether the remote control code is directed to itself or not on the basis of a device address that is included in the header of the signal received from the display unit, and operates according to a device control command that is included in the remote control code of the signal received from the display unit when the video device decides that the remote control code is directed to itself. Therefore, it is possible to operate a remote controller associated with each video device while aiming the same at a display, and thereby easily operate the video device corresponding to the remote controller. Therefore, it is possible to operate a remote controller associated with each video device with aiming the same at a display, and thereby easily operate the video device corresponding to the remote controller.

According to a fifth aspect of the present invention, in the audio visual system defined in any of the first to fourth aspects, the respective video devices have switching disable commands; and the display unit obtains the switching disable commands from the respective video devices and creates a switching disable command table, and does not connect a video device corresponding to the remote controller to the display section when the remote control code transmitted from the remote controller includes a switching disable command that is stored in the switching disable command table. Therefore, it is possible to set a video device so as not to perform video display when executing operations such as recording, fast forward, or fast reverse, whereby unnecessary video display can be avoided.

According to a sixth aspect of the present invention, in the audio visual system defined in any of the first to fourth aspects, the respective video devices have switching enable commands; and the display unit obtains the switching enable commands from the respective video devices and creates a switching enable command table, and connects a video device corresponding to the remote controller to the display section when the remote control code outputted from the remote controller includes a switching enable command that is included in the switching enable command table. Therefore, it is possible to set a video device so as to perform video display only when executing operations such as playback, fast-forward playback, or fast-reverse playback, whereby unnecessary video display can be avoided.

According to a seventh aspect of the present invention, in the audio visual system defined in any of the first to fourth aspects, each of the respective video devices has at least one of maker ID information and device ID information, and transmits the maker ID information or the device ID information to the display unit after being connected to the display unit; and the display unit creates a connected-device table on the basis of the maker ID information or the device ID information transmitted from the respective video devices, identifies a video device corresponding to the remote controller from the connected-device table using at least one of the maker ID information and the device ID information that is included in the remote control code outputted from the remote controller, and connects the video device to the display section of the display unit. Therefore, a video device connected to a display can be automatically recognized.

According to an eighth aspect of the present invention, in the audio visual system defined in any of the first to fourth aspects, each of the respective video devices has at least one of a vender ID and a device address, and transmits the vender ID or the device address to the display unit after being connected to the display unit; and the display unit has at least one of maker ID information corresponding to vender IDs and device ID information corresponding to device addresses, creates a connected-device table on the basis of the vender IDs or the device addresses transmitted from the respective video devices, identifies a video device corresponding to the remote controller from the connected-device table using at least one of the maker ID information and the device ID information that is included in the remote control code outputted from the remote controller, and connects the video device to the display section. Therefore, a video device connected to a display can be automatically recognized.

According to a ninth aspect of the present invention, in the audio visual system defined in any of the first to fourth aspects, an interface means for connecting the display unit and the plural video devices is a digital interface.

According to a tenth aspect of the present invention, in the audio visual system defined in any of the first to fourth aspects, the interface means for connecting the display unit and the plural video devices is HDMI.

According to an eleventh aspect of the present invention, in the audio visual system defined in any of the first to fourth aspects, the interface means for connecting the display unit and the plural video devices is DVI.

According to a twelfth aspect of the present invention, there is provided an audio visual system comprising a display unit, an AV switch connected to the display unit, a plurality of video devices connected to the AV switch, and remote controllers for controlling the respective video devices, wherein one of the remote controllers transmits a remote control code to the display unit; the display unit transfers the remote control code transmitted from the remote controller, to the AV switch; and the AV switch connects one of the plural video devices, which corresponds to the remote controller, to a display section of the display unit according to the remote control code transmitted from the display unit. Therefore, it is possible to operate a remote controller associated with each video device while aiming the same at a display, and thereby automatically select the video device corresponding to the remote controller.

According to a thirteenth aspect of the present invention, there is provided an audio visual system comprising a display unit, an AV switch connected to the display unit, a plurality of video devices connected to the AV switch, and remote controllers for controlling the respective video devices, wherein one of the remote controllers transmits a remote control code to the display unit; the display unit transfers the remote control code transmitted from the remote controller, to the AV switch; the AV switch adds a header to the remote control code transferred from the display unit, and transmits the remote control code to the respective video devices in unison; and each of the video devices checks as to whether the remote control code is directed to itself or not on the basis of maker ID information or device ID information that is included in the remote control code of the signal outputted from the AV switch, and instructs the AV switch to connect itself to a display section of the display unit when the video device decides that the remote control code is directed to itself. Therefore, it is possible to operate a remote controller associated with each video device while aiming the same at a display, and thereby automatically select the video device corresponding to the remote controller.

According to a fourteenth aspect of the present invention, there is provided an audio visual system comprising a display unit, an AV switch connected to the display unit, a plurality of video devices connected to the AV switch, and remote controllers for controlling the respective video devices, wherein one of the remote controllers transmits a remote control code to the display unit; the display unit transfers the remote control code transmitted from the remote controller, to the AV switch; the AV switch adds a header to the remote control code transferred from the display unit, and transmits the remote control code to the respective video devices in unison; and each of the video devices checks as to whether the remote control code is directed to itself or not on the basis of a device address that is included in the header of the signal outputted from the AV switch, and operates according to a remote control command included in the remote control code when the video device decides that the remote control code is directed to itself. Therefore, it is possible to operate a remote controller associated with each video device while aiming the same at a display, and thereby easily operate the video device corresponding to the remote controller.

According to a fifteenth aspect of the present invention, there is provided an audio visual system comprising a display unit, an AV switch connected to the display unit, a plurality of video devices connected to the AV switch, and remote controllers for controlling the respective video devices, wherein one of the remote controllers transmits a remote control code to the display unit; the display unit transfers the remote control code transmitted from the remote controller, to the AV switch; the AV switch adds a header and a device control command to the remote control code transferred from the display unit, and transmits the remote control code to the respective video devices in unison; and each of the video devices checks as to whether the remote control code is directed to itself or not on the basis of a device address that is included in the header of the signal outputted from the AV switch, and operates according to the device control command that is included in the remote control code of the signal outputted from the AV switch when the video device decides that the remote control code is directed to itself. Therefore, it is possible to operate a remote controller associated with each video device while aiming the same at a display, and thereby easily operate the video device corresponding to the remote controller.

According to a sixteenth aspect of the present invention, in the audio visual system defined in any of the twelfth to fifteenth aspects, the respective video devices have switching disable commands; and the AV switch obtains the switching disable commands from the respective video devices and creates a switching disable command table, and does not connect a video device corresponding to the remote controller to the display section of the display unit when the remote control code outputted from the remote controller includes a switching disable command that is stored in the switching disable command table. Therefore, it is possible to set a video device so as not to perform video display when executing operations such as recording, fast forward, or fast reverse, whereby unnecessary video display can be avoided.

According to a seventeenth aspect of the present invention, in the audio visual system defined in any of the twelfth to fifteenth aspects, the respective video devices have switching enable commands; and the AV switch obtains the switching enable commands from the respective video devices and creates a switching enable command table, and connects a video device corresponding to the remote controller to the display section of the display unit when the remote control code outputted from the remote controller includes a switching enable command that is included in the switching enable command table. Therefore, it is possible to set a video device so as to perform video display only when executing operations such as playback, fast-forward playback, or fast-reverse playback, whereby unnecessary video display can be avoided.

According to an eighteenth aspect of the present invention, in the audio visual system defined in any of the twelfth to fifteenth aspects, each of the respective video devices has at least one of maker ID information and device ID information, and transmits the maker ID information or the device ID information to the AV switch after being connected to the display unit; and the AV switch creates a connected-device table on the basis of the maker ID information or the device ID information transmitted from the respective video devices, identifies a video device corresponding to the remote controller from the connected-device table using at least one of the maker ID information and the device ID information that is included in the remote control code outputted from the remote controller, and connects the video device to the display section of the display unit. Therefore, a video device connected to a display can be automatically recognized.

According to a nineteenth aspect of the present invention, in the audio visual system defined in any of the twelfth to fifteenth aspects, each of the respective video devices has at least one of a vender ID and a device address, and transmits the vender ID or the device address to the AV switch after being connected to the display unit; and the AV switch has at least one of maker ID information corresponding to vender IDs and device ID information corresponding to device addresses, creates a connected-device table on the basis of the vender IDs or the device addresses transmitted from the respective video devices, identifies a video device corresponding to the remote controller from the connected-device table using at least one of the maker ID information and the device ID information that is included in the remote control code outputted from the remote controller, and connects the video device to the display section of the display unit. Therefore, a video device connected to a display can be automatically recognized.

According to a twentieth aspect of the present invention, in the audio visual system defined in any of the twelfth to fifteenth aspects, the interface means for connecting the AV switch and the plural video devices is digital interface.

According to a twenty-first aspect of the present invention, in the audio visual system defined in any of the twelfth to fifteenth aspects, the interface means for connecting the AV switch and the plural video devices is HDMI.

According to a twenty-second aspect of the present invention, in the audio visual system defined in any of the twelfth to fifteenth aspects, the interface means for connecting the AV switch and the plural video devices is DVI.

According to a twenty-third aspect of the present invention, in the audio visual system defined in any of the twelfth to fifteenth aspects, the interface means for connecting the display unit and the AV switch is a digital interface.

According to a twenty-fourth aspect of the present invention, in the audio visual system defined in any of the twelfth to fifteenth aspects, the interface means for connecting the display unit and the AV switch is HDMI.

According to a twenty-fifth aspect of the present invention, in the audio visual system defined in any of the twelfth to fifteenth aspects, the interface means for connecting the display unit and the AV switch is DVI.

BRIEF DESCRIPTION OF THE DRAWINGS

FIG. 5 is a diagram for explaining a connected device recognition method according to the first embodiment of the invention.

FIG. 6 is a diagram illustrating formats of a maker code and a device code which are stored in a connected-device table in the AV system of the present invention.

FIG. 7 is a diagram illustrating an example of a connected-device table to be created on a display or AV switch side which is a constituent of the AV system of the present invention.

FIG. 18 is a diagram illustrating an example of a connected-device table to be created on the display or AV system side that is a constituent of the AV system of the invention.

FIG. 19 is a diagram illustrating a vender ID table to be previously stored in a memory of the display or AV switch that is a constituent of the AV system of the invention.

FIG. 20 is a diagram illustrating a device address table to be previously stored in a memory of the display or AV switch that is a constituent of the AV system of the invention.

FIG. 36 is a diagram illustrating a switching enable command table.

DETAILED DESCRIPTION OF THE PREFERRED EMBODIMENTS

Hereinafter, preferred embodiments of the present invention will be described with reference to the drawings. The embodiments described hereinafter are merely examples, and the present invention is not restricted thereto.

Embodiment 1

Hereinafter, an AV system according to a first embodiment of the present invention will be described.

Figure 1:
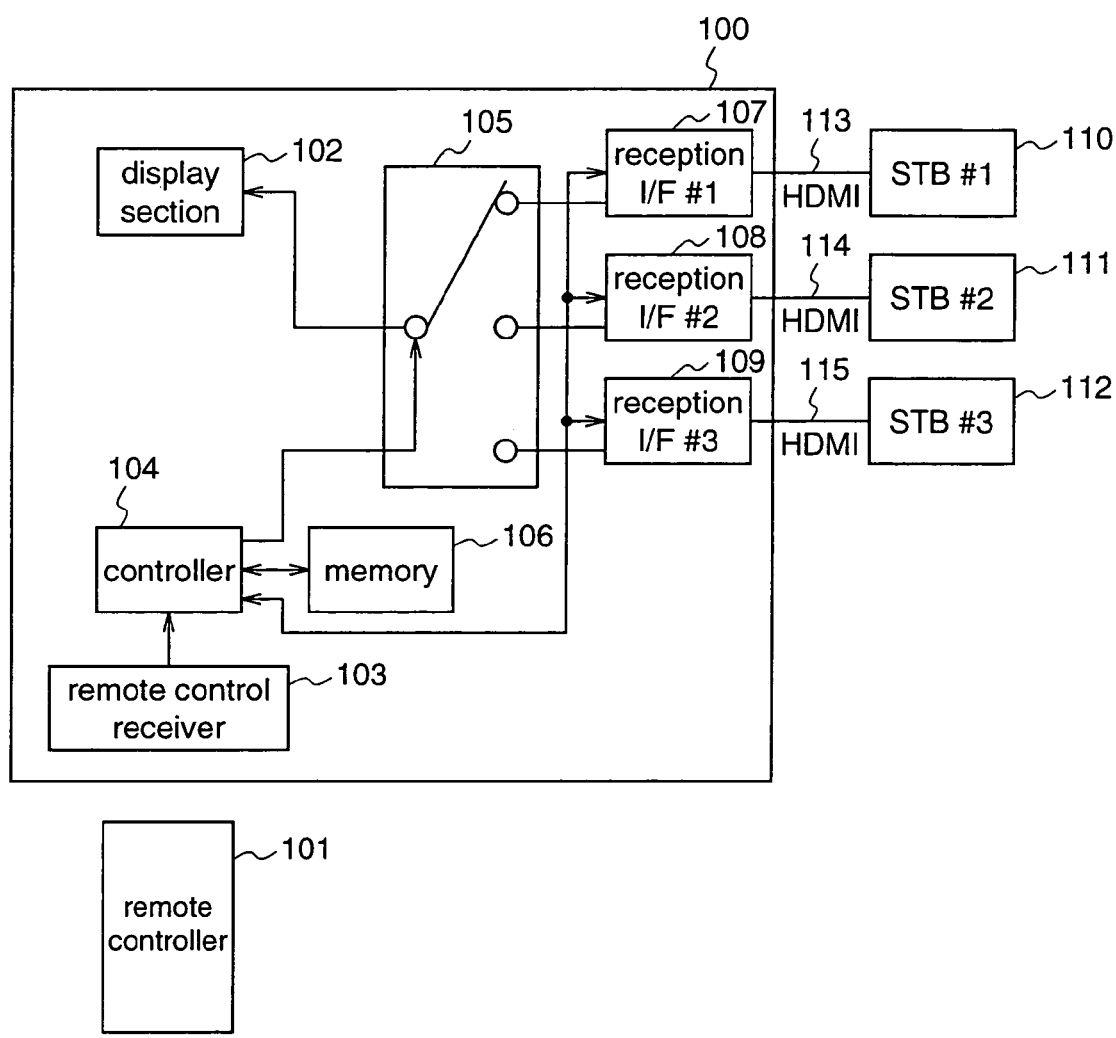
FIG. 1 is a block diagram illustrating an AV system according to a first embodiment of the present invention.

FIG. 1 is a block diagram illustrating the construction of the AV system according to the first embodiment.

In FIG. 1, reference numeral 100 denotes a display unit for displaying inputted video, and outputting audio. Reference numeral 101 denotes a remote controller associated with one of connected devices described later. Reference numeral 102 denotes a display section for displaying video and outputting audio, and preferably, the display section 102 comprises a CRT, or a liquid crystal panel, or a plasma display, and a speaker. Reference numeral 103 denotes a remote control receiver for receiving a signal outputted from the remote controller 101. Reference numeral 104 denotes a controller of the display unit 100, for controlling the whole display unit. Preferably, the controller 104 is a CPU. Reference numeral 105 denotes a selector for selecting video data and audio data from the plural devices connected to the display. Reference numeral 106 denotes a memory for holding a table of connected devices, which is described later. Reference numerals 107~109 denote first to third reception interfaces. In the following embodiments, these interfaces are digital interfaces and, among digital interfaces, HDMI (High Definition Multimedia Interface) is taken as an example. Reference numerals 110~112 denote first to third STBs (Set Top Boxes) for receiving broadcasts, and reproducing video and audio. While in this first embodiment an STB is taken as an example of each connected device, any device, such as a DVD, a VTR, or a game machine, may be employed so long as the device outputs video. Further, any STB, such as an STB for BS/CS broadcasting, an STB for terrestrial broadcasting, or an STB for cable broadcasting, may be employed. Reference numerals 113~115 denote HDMI cables for transmitting video data, audio data, and control signals. While in this first embodiment the display and the STBs are connected using the HDMI cables, DVIs (Digital Visual Interfaces) may be used.

Figure 2:
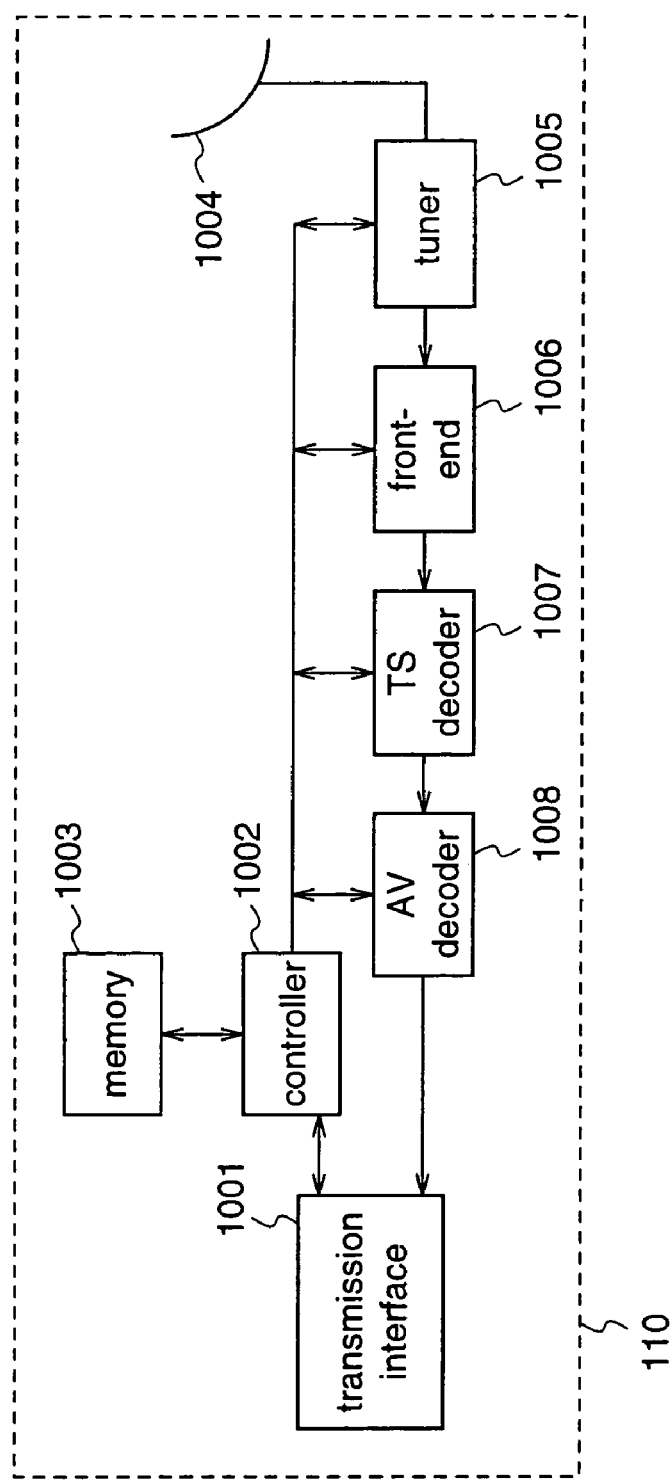
FIG. 2 is a block diagram illustrating the construction of a first STB included in the AV system of the present invention.

FIG. 2 is a block diagram illustrating the construction of the first STB 110 which receives digital broadcasting.

In FIG. 2, reference numeral 1001 denotes a transmission interface which is connected to the reception interface of the display 100, and outputs video and audio to the display 100. When employing a digital interface, it is an HDMI transmission interface. Reference numeral 1002 denotes a controller for controlling the respective blocks in the first STB 110. Reference numeral 1003 denotes a memory for holding a maker code and a device code of the first STB 110. Reference numeral 1004 denotes an antenna for receiving a radio wave of digital broadcasting. Reference numeral 1005 denotes a tuner for demodulating the broadcast wave. Reference numeral 1006 denotes a front-end for subjecting the demodulated signal to error correction and the like, thereby reproducing a TS (Transport Stream). Reference numeral 1007 denotes a TS decoder for extracting packets (video, audio, data, etc.) of a program that is selected by the user from a TS in which plural programs are multiplexed. Reference numeral 1008 denotes an AV decoder for decompressing the video packets and audio packets extracted by the TS decoder to output digital video signal and audio signal.

Since the second STB 111 and the third STB 112 are identical in construction to the first STB 110, block diagrams thereof will be omitted.

Figure 3:
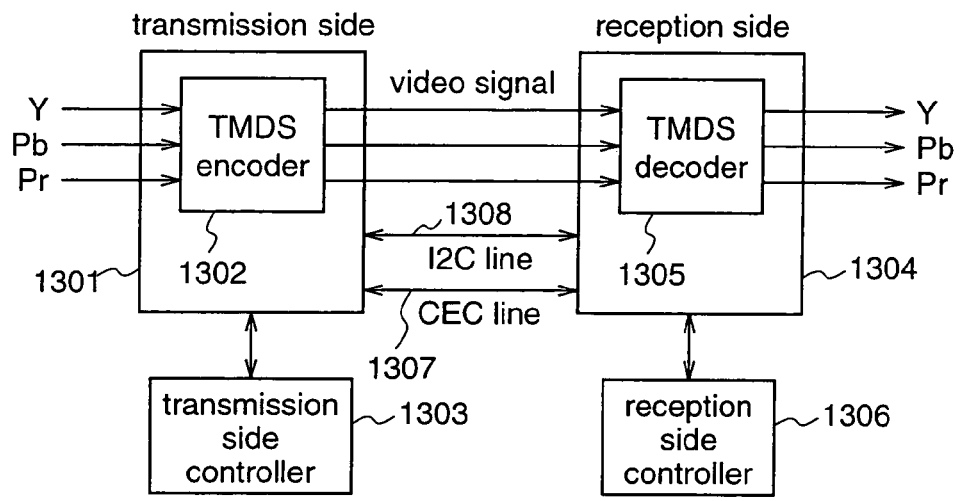
FIG. 3 is a block diagram illustrating the outline of the construction of an HDMI.

Next, the construction of the HDMI will be described. The HDMI is shown in FIG. 3. The HDMI comprises a transmitter and a receiver, and the transmitter is included in a device which is a source of video and audio, such as a STB, a DVD, or a VTR, while the receiver is included in a device for displaying and outputting video and audio, such as a display unit. The transmitter and the receiver are connected by a HDMI cable.

In FIG. 3, reference numeral 1301 denotes a transmitter for TMDS-encoding a video signal (Y, Pb, Pr) and an audio signal (IEC 958), and outputting the signals in a form suitable to high-speed transmission to the receiver 1304. Reference numeral 1302 denotes a TMDS encoder for converting video data of parallel 8 bits×3 channels into video data of serial 10 bits×3 channels, and converting audio data of parallel 4 bits into audio data of serial 10 bits. Reference numeral 1303 denotes a transmission controller for controlling the transmitter 1301. Reference numeral 1304 denotes a receiver for TMDS-decoding the video data and audio data transmitted from the transmitter 1301 to reproduce base-band video data and audio data. Reference numeral 1305 denotes a TMDS decoder for converting video data of serial 10 bits into video data of parallel 8 bits, and converting audio data of serial 10 bits into audio data of parallel 4 bits. Reference numeral 1306 denotes a reception controller for controlling the receiver 1304. Reference numeral 1307 denotes a device control line for transmitting control signals for consumer devices. An example of the device control line is a CEC (Consumer Electronics Control) line. Reference numeral 1308 denotes a DDC (Display Data Channel) line for transmitting display control signals.

The relationship between the display 100 and the STB connected to the display 100 (FIGS. 1 and 2), and the HDMI (FIG. 3) is as follows. That is, the transmission interface 1001 of the STB corresponds to the transmitter 1301 shown in FIG. 3, and the first to third reception interfaces 107~109 shown in FIG. 1 correspond to the receiver 1304 shown in FIG. 3.

Figure 4:
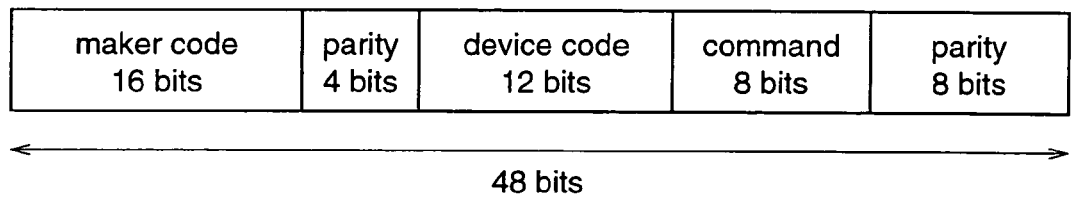
FIG. 4 is a diagram illustrating a format of a remote control code.

FIG. 4 shows a format of a remote control code outputted from the remote controller. As shown in FIG. 4, the remote control code is 48 bits long, including a maker code of 16 bits and a device code of 12 bits. The format of the remote control code may be other than that shown in FIG. 4. That is, while in FIG. 4 the remote control code is 48 bits long, the length may be other than 48 bits. Further, while in FIG. 4 the maker code and the device code are 16 bits and 12 bits long, respectively, the bit lengths thereof are not restricted thereto.

The operation of the AV system of the first embodiment constituted as described above will be described.

Initially, the first half of the processing flow (connected device recognizing method) according to the first embodiment will be described with reference to FIG. 5. The first half of the processing corresponds to the process steps from when the display 100 and the STBs are connected to when the maker codes and device codes of the STBs are stored in the memory of the display.

In STEP 1, the display 100 and the first STB 110 are connected. To be specific, the reception interface 107 of the display 100 and the transmission interface 1001 of the first STB 110 are connected by the HDMI cable 113.

In STEP 2, the controller 104 of the display 100 reads the maker code and device code of the first STB 110 from the first STB 110 via the device control line of the HDMI cable 113.

In STEP 3, the maker code and device code which have been read in STEP 2 are written in the memory 106 of the display 100 together with the reception interface number.

Likewise, the second STB 111 and the third STB 112 are also connected to the display 100 using the HDMI cables, and the maker codes and device codes of the respective STBs 111 and 112 are written in the memory 106 of the display 100 together with the reception interface numbers.

Through the above-described processing, the maker codes and device codes of the first to third STBs 110~112 are stored in the memory 106, and a connected-device table is created. The format of the maker code and device code stored in the connected-device table is shown in FIG. 6, and the connected-device table is shown in FIG. 7. The first to third reception interfaces 107~109 correspond to reception interface numbers 1, 2, and 3, respectively.

Figure 8:
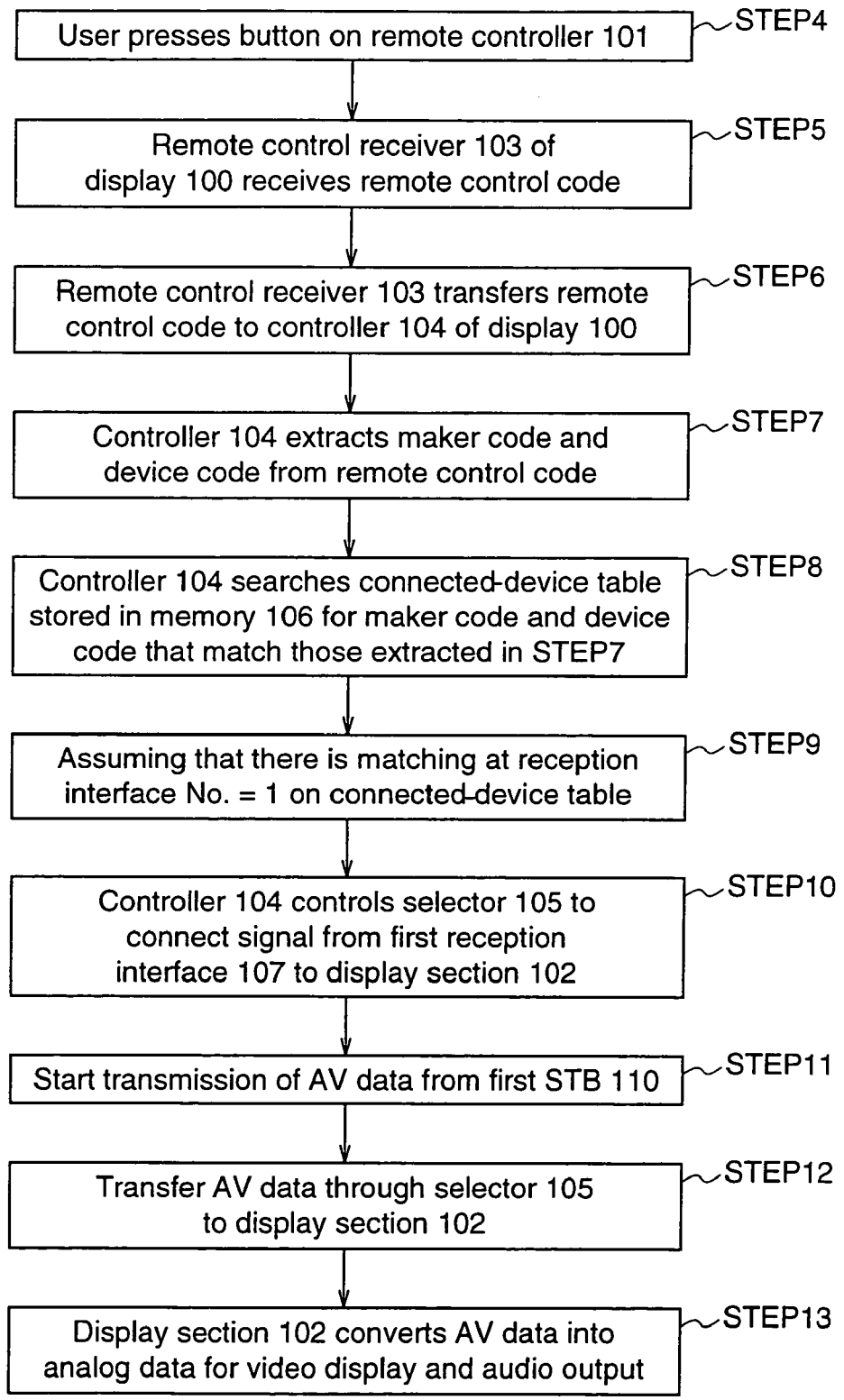
FIG. 8 is a diagram for explaining a connected device switching method according to the first embodiment of the invention.

Next, the latter half of the processing flow according to the first embodiment (connected device switching method) will be described using FIG. 8. The latter half of the processing corresponds to the process steps from when the user presses a remote control button to when the connected device (STB) is selected for video display and audio output.

In STEP 4, the user presses a button on the remote controller 101 the user wants to use. The button to be pressed may be an arbitrary button or a specific button.

In STEP 5, the remote control receiver 103 of the display 100 receives the remote control code outputted from the remote controller 101.

In STEP 6, the remote control receiver 103 transfers the remote control code to the controller 104 of the display 100.

In STEP 7, the controller 104 extracts the maker code and the device code from the remote control code.

In STEP 8, the controller 104 searches the connected-device table stored in the memory 106, for a maker code and a device code that match the maker code and the device code extracted in STEP 7.

In STEP 9, it is assumed that there is matching at the reception interface No. =1 on the connected-device table.

In STEP 10, the controller 104 controls the selector 105 to connect the signal from the first reception interface 107 to the display section 102.

In STEP 11, transmission of AV data from the first STB 110 is started.

In STEP 12, the AV data is transmitted through the selector 105 to the display section 102.

In STEP 13, the AV data in the display section 102 is analog-converted to perform video display and audio output.

In the above-mentioned processing, when the user presses the button on the remote controller associated with one of the connected devices such as STBs while aiming the remote controller at the display 100, video and audio from the device corresponding to the remote controller are automatically displayed and outputted.

According to the first embodiment of the present invention, when the first to third STBs 110~112 are connected to the display 100, the display 100 reads the maker codes and the device codes from the respective STBs 110~112 and creates the connected-device table. When the user presses the button on the remote controller, the display 100 receives the remote control code outputted from the remote controller, and searches the connected-device table for a maker code and a device code that match those included in the remote control code. Then, the selector 105 is controlled so that the reception interface connected to the STB whose maker code and device code match those included in the remote controller is connected to the display section 102, and the AV data from the STB is transferred to the display 100, wherein the AV data is displayed and reproduced by the display section 102. Therefore, by only pressing the button on the remote controller aiming at the display, the connected device corresponding to the remote controller is automatically selected, and the AV data from the selected device is automatically displayed on the display. As a result, it becomes unnecessary for the user to specially operate the remote controller to select the connected device corresponding to the remote controller as in the conventional system, resulting in significant improvement in operability for the user.

Embodiment 2

Hereinafter, an AV system according to a second embodiment of the present invention will be described. This second embodiment is different from the first embodiment only in that the AV switch is separated from the display in this second embodiment while the function of the AV switch is included in the display in the first embodiment.

Figure 9:
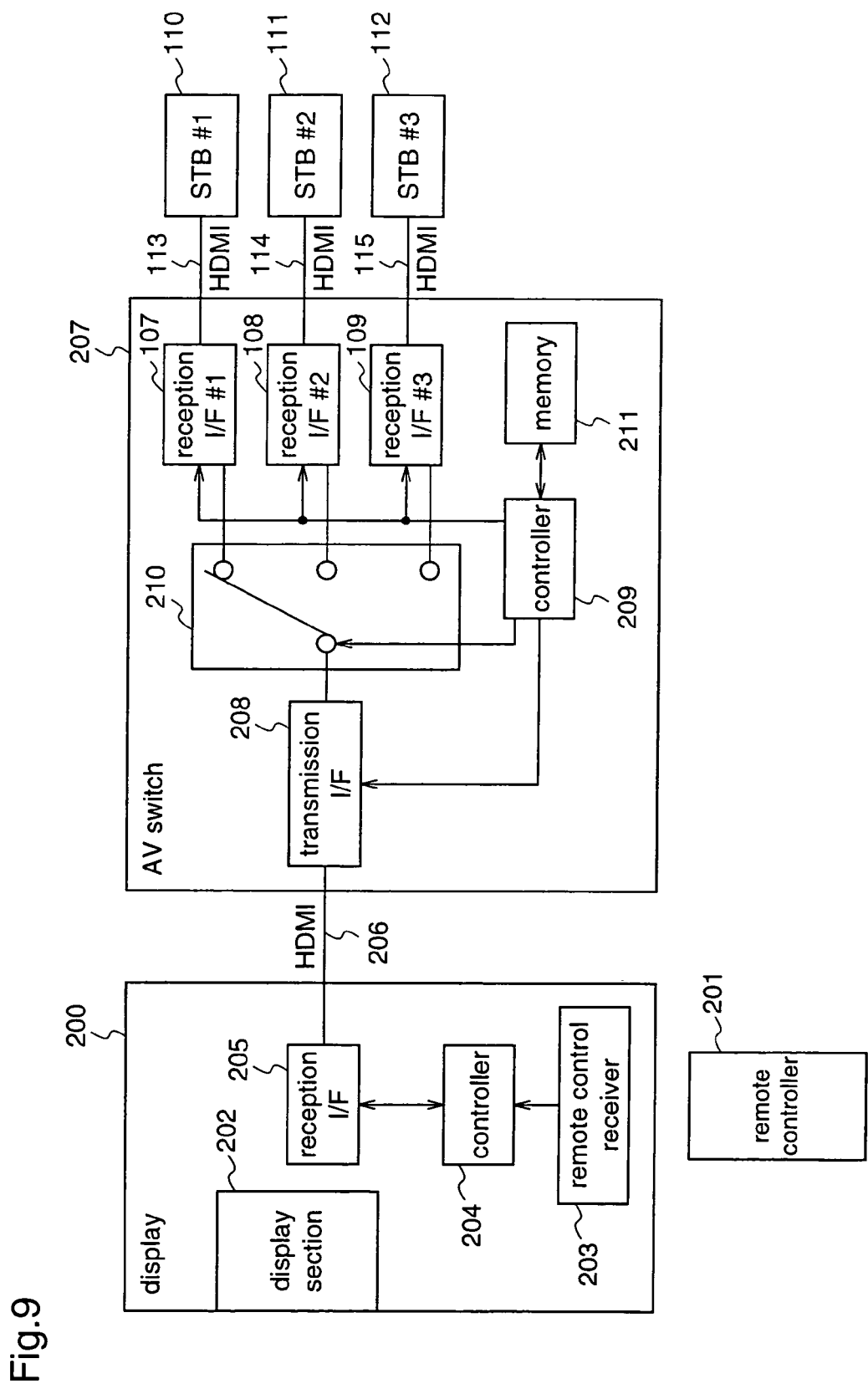
FIG. 9 is a block diagram illustrating the construction of an AV system according to a second embodiment of the present invention.

FIG. 9 is a block diagram illustrating the construction of the AV system according to the second embodiment. In FIG. 9, the same reference numerals as those shown in FIG. 1 denote the same or corresponding constituents.

Reference numeral 200 denotes a display for displaying inputted video, and outputting audio. In this second embodiment, the display 200 includes no AV switch. Reference numeral 201 denotes a remote controller that is associated with one of plural connected devices. Reference numeral 202 denotes a display unit for displaying video and outputting audio. Preferably, the display section 202 comprises a CRT, or a liquid crystal panel, or a plasma display, and a speaker. Reference numeral 204 denotes a remote control receiver for receiving a signal from the remote controller 201. Reference numeral 204 denotes a controller of the display 200, for controlling the whole display. Preferably, the controller 204 is a CPU. Reference numeral 205 denotes a reception interface of the display, for receiving AV data supplied from an AV switch 207 described later. Reference numeral 206 denotes an HDMI cable for connecting the display 200 and the AV switch 207. The HDMI cable 206 transmits the AV data from the AV switch 207 to the display 200, and exchanges control signals including a remote control code. Reference numeral 207 denotes an AV switch for selecting AV data supplied from the respective connected devices, and outputting the data to the display 200. Reference numeral 208 denotes a transmission interface of the AV switch 207, for outputting the AV data to the display 200. Reference numeral 209 denotes a controller of the AV switch 207, for controlling the AV switch 207. Reference numeral 210 denotes a selector for selecting video data and audio data supplied from plural devices connected to the AV switch 207. Reference numeral 211 denotes a memory for holding a table of the connected devices.

In this second embodiment, the display 200 and the AV switch 207 are separated from each other, and are connected by the HDMI.

Hereinafter, the operation of the AV system constructed as described above will be described.

Initially, the first half of the processing flow (connected device recognition method) according to the second embodiment will be described with reference to FIG. 10. The first half of the processing corresponds to the process steps from when the AV switch 207 and the STBs are connected to when the maker codes and device codes of the STBs are stored in the memory of the AV switch 207.

In STEP 101, the AV switch 207 and the first STB 110 are connected. More specifically, the reception interface 107 of the AV switch 207 and the transmission interface 1001 of the first STB 110 are connected by the HDMI cable 113.

In STEP 102, the controller 209 of the AV switch 207 reads the maker code and device code of the first STB 110 from the first STB 110 through the device control line of the HDMI cable 113.

In STEP 103, the maker code and device code which have been read in STEP 102 are written in the memory 106 of the AV switch 207 together with the reception interface number.

Likewise, the second STB 111 and the third STB 112 are also connected to the AV switch 207 using the HDMI cables 114 and 115, respectively, and the maker codes and device codes of the STBs 111 and 112 are written in the memory 211 of the AV switch 207 together with the reception interface numbers.

Through the above-described processing, the maker codes and device codes of the first to third STBs 110~112 are stored in the memory 211 of the AV switch 207, and the connected-device table shown in FIG. 7 is created.

Figure 11:
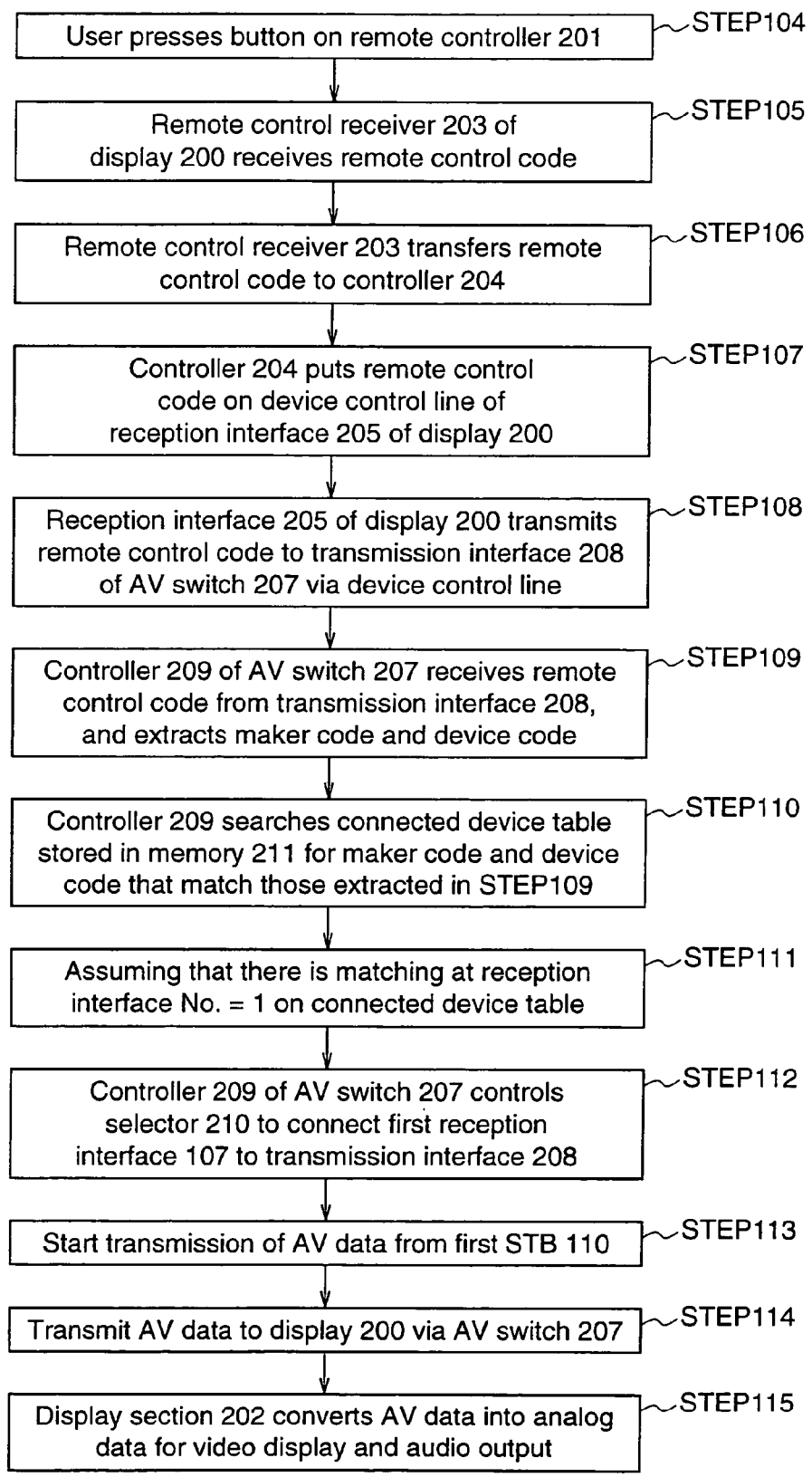
FIG. 11 is a diagram for explaining a connected device switching method according to the second embodiment of the invention.
Figure 12:
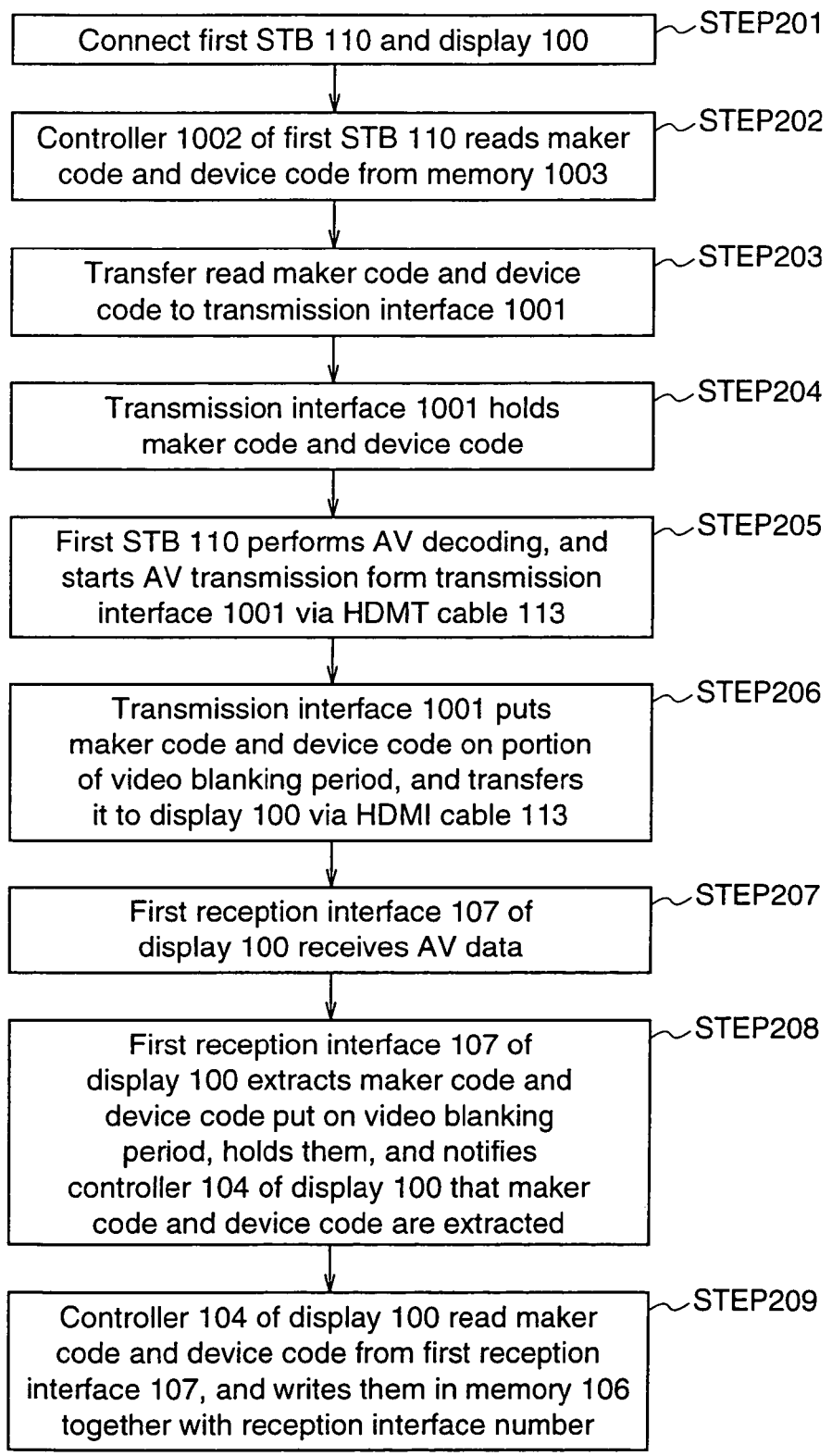
FIG. 12 is a diagram for explaining a connected device recognition method according to a third embodiment of the present invention.

Next, the latter half of the processing flow (connected device switching method) will be described with reference to FIG. 11. The latter half of the processing corresponds to the process steps from when the user presses a remote control button to when a connected device (STB) is selected to perform video display and audio output.

In STEP 104, the user presses the button on the remote controller 201.

In STEP 105, the remote control receiver 203 of the display 200 receives the remote control code outputted from the remote controller 201.

In STEP 106, the remote control receiver 203 transfers the remote control code to the controller 204 of the display 200.

In STEP 107, the controller 204 puts the remote control code on the device control line of the reception interface 205 of the display 200.

In STEP 108, the reception interface 205 of the display 200 transmits the remote control code to the transmission interface 208 of the AV switch 207 through the device control line.

In STEP 109, the controller 209 of the AV switch 207 receives the remote control code from the transmission interface 208, and extracts the maker code and device code from the remote control code.

In STEP 110, the controller 209 searches the connected-device table stored in the memory 211, for a maker code and a device code that match the maker code and the device code extracted in STEP 109.

In STEP 111, it is assumed that there is matching at the reception interface No. =1 on the connected-device table.

In STEP 112, the controller 209 controls the selector 210 to connect the first reception interface 107 to the transmission interface 208.

In STEP 113, transmission of AV data from the first STB 110 is started.

In STEP 114, the AV data is transmitted to the display 200 through the AV switch 207.

In STEP 115, the display section 202 converts the AV data into analog data to perform video display and audio output.

In the above-described processing, when the user presses the button on the remote controller associated with one of the connected devices, such as an STB, while aiming the remote controller at the display, video and audio data from the device corresponding to the remote controller are automatically displayed and outputted.

According to the second embodiment of the invention, when the first to third STBs 110~112 are connected to the AV switch 207 that is connected to the display 200 by the HDMI cable 206, the AV switch 207 reads the maker codes and device codes from the respective STBs 110~112 to create a connected-device table. When the user presses the button on the remote controller, the display 200 receives the remote control code outputted from the remote controller, and transmits it to the AV switch 207. In the AV switch 207, the connected-device table is searched for a maker code and a device code that match the maker code and the device code included in the remote control code, and the selector 210 is controlled so that the transmission interface 208 is connected to the reception interface 107 that is connected to the STB whose maker code and device code match those included in the remote control code. Then, AV data is transferred from the STB through the AV switch 207 to the display 200, wherein the AV data is displayed and reproduced by the display section 202. Therefore, by only pressing the button on the remote controller aiming at the display, the connected device corresponding to the remote controller is automatically selected, and the AV data from the selected device is automatically displayed on the display. As a result, it becomes unnecessary for the user to specially operate the remote controller to select the connected device corresponding to the remote controller as in the conventional system, resulting in significant improvement in operability for the user.

Embodiment 3

Hereinafter, an AV system according to a third embodiment of the present invention will be described.

The construction of the AV system according to the third embodiment is identical to that of the first embodiment (refer to FIG. 1), and the function of the AV switch is included in the display.

The difference between the third embodiment and the first embodiment is as follows. While in the first embodiment the maker code and device code are transferred from the connected device such as an STB using the device control line of the HDMI, in this third embodiment the maker code and device code are put on a portion of a video blanking period and transferred from the STB.

Hereinafter, the first half of the processing flow (connected device recognition method) according to the third embodiment will be described with reference to FIG. 1. The first half of the processing corresponds to the process steps from when the STBs and the display are connected to when the maker codes and device codes of the STBs are stored in the memory of the display.

In STEP 201, the display 100 and the first STB 110 are connected.

In STEP 202, the controller 1002 of the first STB 110 reads the maker code and device code from the memory 1003.

In STEP 203, the maker code and device code read in STEP 202 are transferred to the transmission interface 1001.

In STEP 204, the transmission interface 1001 holds the maker code and device code.

In STEP 205, the first STB 110 performs AV decoding, and starts AV transmission from the transmission interface 1001 via the HDMI cable 113.

In STEP 206, the transmission interface 1001 puts the maker code and device code on a portion of the video blanking period, and transfers it to the display 100 via the HDMI cable 113. The manner of putting the maker code and device code on the blanking period will be described later.

In STEP 207, the first reception interface 107 of the display 100 receives the AV data from the HDMI cable 113.

In STEP 208, the first reception interface 107 of the display 100 extracts the maker code and device code put on the video blanking period, and holds them. Further, the first reception interface 107 notifies the controller 104 of the display 100 that the maker code and device code are extracted.

In STEP 209, the controller 104 of the display 100 reads the maker code and device code from the first reception interface 107, and writes them in the memory 106 together with the reception interface number.

Likewise, the second STB 111 and the third STB 112 are also connected to the display 100 using the HDMI cables, and the maker codes and device codes of the respective STBs 111 and 112 are written in the memory 106 of the display 100 together with the reception interface numbers.

Through the above-described processing, the maker codes and device codes of the first to third STBs 110~112 are stored in the memory 106 of the display 100, and a connected-device table is created.

Figure 13:
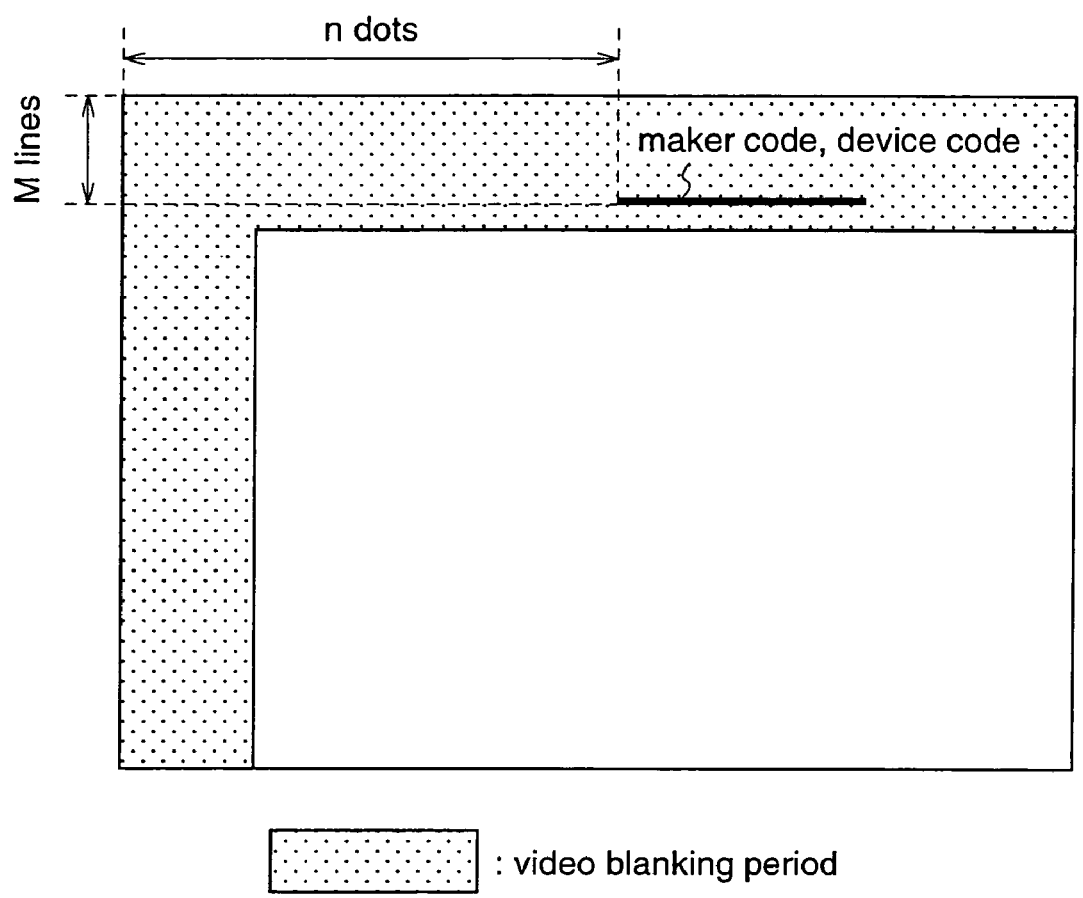
FIG. 13 is a diagram for explaining a method of putting a maker code and a device code on a video blanking period, according to the third and fourth embodiments of the present invention.

The manner of putting the maker code and device code in STEP 206 is shown in FIG. 13. With reference to FIG. 13, the maker code of 16 bits and the device code of 12 bits are put on a position at the m-th line in the vertical direction and the n-th dot in the horizontal direction from the upper left corner of the frame of the video blanking period. The temporal order in which the maker code and the device code are put may be inverted. The transmission interface 1001 of the first STB 110 detects the upper left corner of the frame from a horizontal sync signal and a vertical sync signal outputted from the AV decoder 1008, and puts the maker code and device code on a temporal position that is obtained by performing m-line count in the vertical direction and n-dot count in the horizontal direction. Then, in STEP 208, the first reception interface 107 restores the horizontal sync signal and the vertical sync signal to detect the upper left corner of the frame, and extracts the maker code and device code which are put at the m-th line in the vertical direction and the n-th dot in the horizontal direction.

Figure 14:
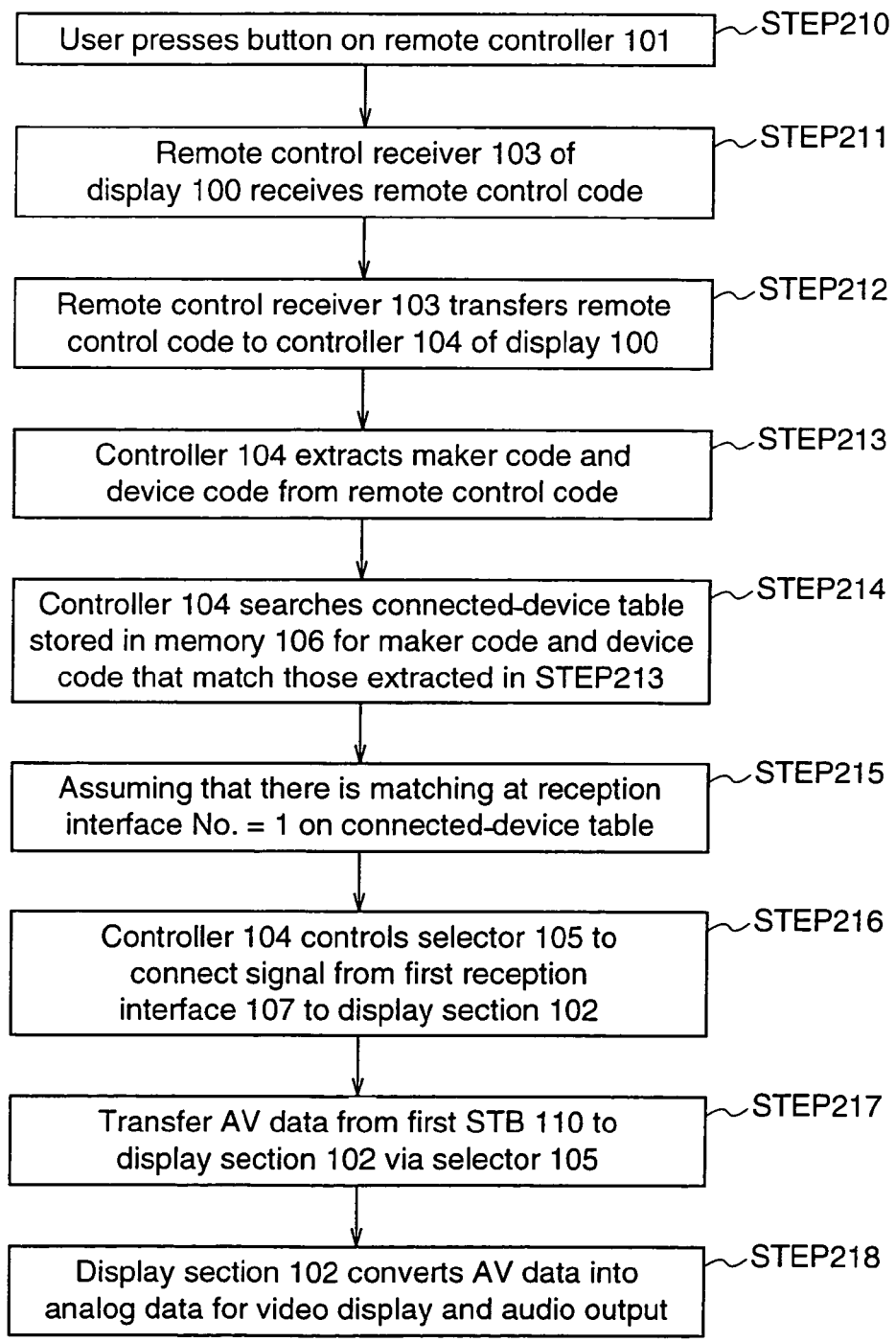
FIG. 14 is a diagram for explaining a connected device switching method according to the third embodiment of the invention.

Next, the latter half of the processing flow (connected device switching method) will be described with reference to FIG. 14. The latter half of the processing corresponds to the process steps from when the user presses a remote control button to when a connected device (STB) is selected to perform video display and audio output.

In STEP 210, the user presses the button on the remote controller 101.

In STEP 211, the remote control code outputted from the remote controller 101 is received by the remote control receiver 103 of the display 100.

In STEP 212, the remote control receiver 103 transfers the remote control code to the controller 104 of the display 100.

In STEP 213, the controller 104 extracts the maker code and device code from the remote control code.

In STEP 214, the controller 104 searches the connected-device table stored in the memory 106, for a maker code and a device code that match the maker code and the device code extracted in STEP 213.

In STEP 215, it is assumed that there is matching at the reception interface No. =1 on the connected-device table.

In STEP 216, the controller 104 controls the selector 105 to connect the signal from the first reception interface 107 to the display section 102.

In STEP 218, the display section 102 converts the AV data into analog data to perform video display and audio output.

In the above-described processing, when the user presses the button on the remote controller associated with one of the connected devices, such as an STB, while aiming the remote controller at the display, video and audio data from the device corresponding to the remote controller are automatically displayed and outputted.

According to the third embodiment of the invention, when the first to third STBs 110~112 are connected to the display 100, each STB puts its maker code and device code on a portion of the video blanking period, and transfers them to the display 100. The display 100 extracts the maker code and device code from the video blanking period, and creates a connected-device table. When the user presses the button on the remote controller, the display 100 receives the remote control code outputted from the remote controller, and searches the connected-device table for a maker code and a device code that match the maker code and the device code included in the remote control code. Then, the selector 105 is controlled so that the reception interface connected to the STB having the matching maker code and device code is connected to the display section 102, and AV data is transferred from the STB to the display 100, wherein the AV data is displayed and reproduced by the display section 102. Therefore, by only pressing the button on the remote controller aiming at the display, the connected device corresponding to the remote controller is automatically selected, and the AV data from the selected device can be automatically displayed on the display. As a result, it becomes unnecessary for the user to specially operate the remote controller to select the connected device corresponding to the remote controller as in the conventional system, resulting in significant improvement in operability for the user.

Embodiment 4

Hereinafter, an AV system according to a fourth embodiment of the present invention will be described. This fourth embodiment is a combination of the second embodiment and the third embodiment. That is, the AV system according to this fourth embodiment is characterized in that the display and the AV switch are separated from each other as in the second embodiment, and the maker code and device code are transmitted from the connected device such as an STB during the video blanking period. The construction of the AV system according to the fourth embodiment is shown in FIG. 9. Since FIG. 9 has already been described for the second embodiment, repeated description is not necessary.

Hereinafter, the operation of the AV system according to the fourth embodiment will be described.

Figure 15:
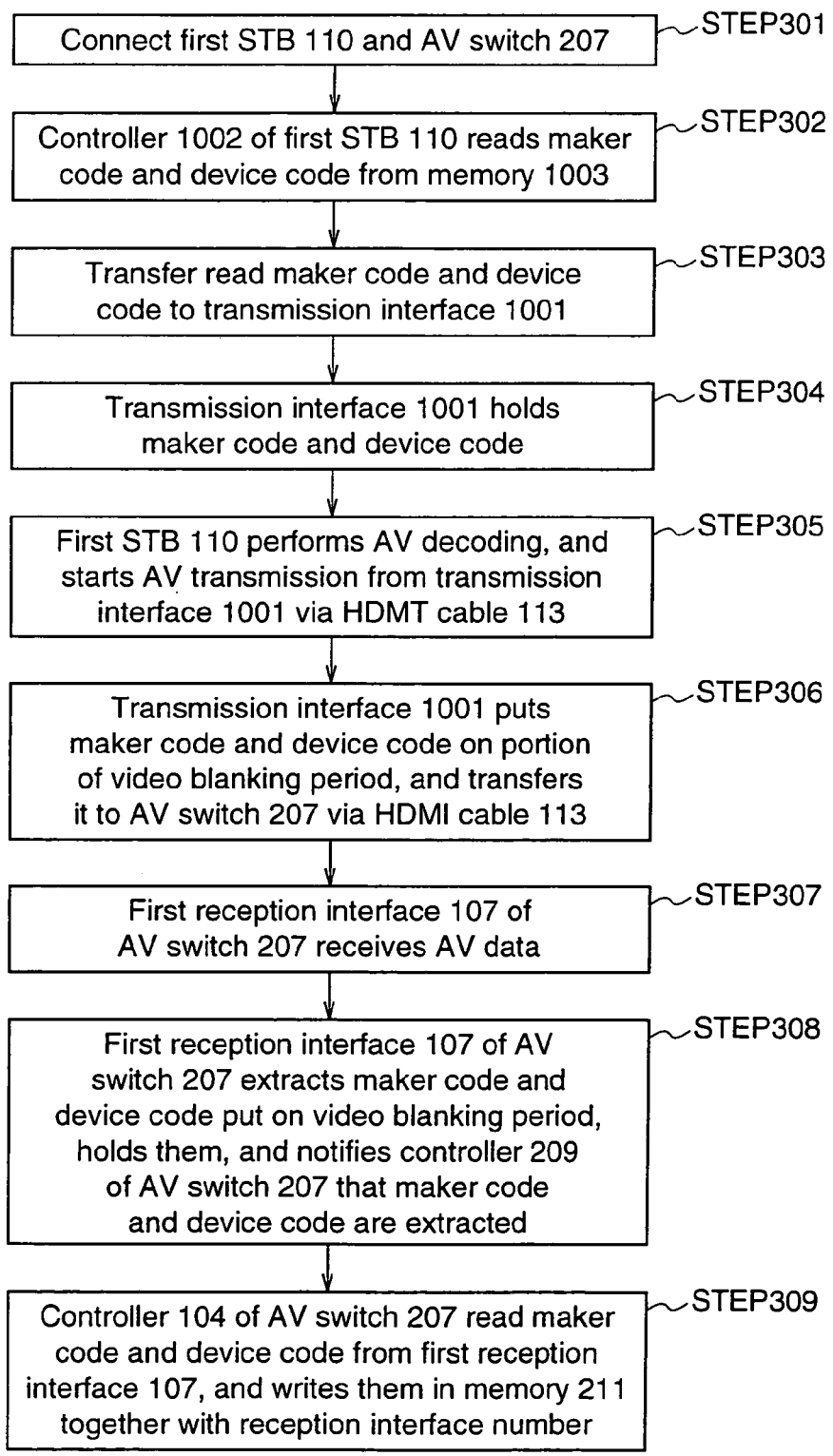
FIG. 15 is a diagram for explaining a connected device recognition method according to the fourth embodiment of the invention.

Initially, the first half of the processing flow (connected device recognition method) according to the fourth embodiment will be described with reference to FIG. 15. The first half of the processing corresponds to the process steps from when the AV switch 207 and the STBs are connected to when the maker codes and device codes of the STBs are stored in the memory of the AV switch 207.

In STEP 301, the AV switch 207 and the first STB 110 are connected.

In STEP 302, the controller 1002 of the first STB 110 reads the maker code and device code from the memory 1003.

In STEP 303, the controller 1002 transfers the maker code and device code that are read in STEP 202 to the transmission interface 1001.

In STEP 304, the transmission interface 1001 holds the maker code and device code.

In STEP 305, the first STB 110 performs AV decoding, and starts AV transmission from the transmission interface 1001 through the HDMI cable 113.

In STEP 306, the transmission interface 1001 puts the maker code and device code on a portion of the video blanking period, and transmits them to the AV switch 207 through the HDMI cable 113.

In STEP 307, the first reception interface 107 of the AV switch 207 receives the AV data from the HDMI cable 113.

In STEP 308, the first reception interface 107 of the AV switch 207 extracts the maker code and device code that are put on the video blanking period, and holds the codes. Further, the first reception interface 107 notifies the controller 209 of the AV switch 207 that the maker code and device code are extracted.

In STEP 309, the controller 209 of the AV switch 207 reads the maker code and device code from the first reception interface 107, and writes them in the memory 211 together with the reception interface numbers.

Likewise, the second STB 111 and the third STB 112 are also connected to the AV switch 207 using the HDMI cables, and the maker codes and device codes of the respective STBs 111 and 112 are written in the memory 211 of the AV switch 207 together with the reception interface numbers.

Through the above-described processing, the maker codes and device codes of the first to third STBs 110~112 are stored in the memory 211 of the AV switch 207, and the connected-device table is created.

Figure 16:
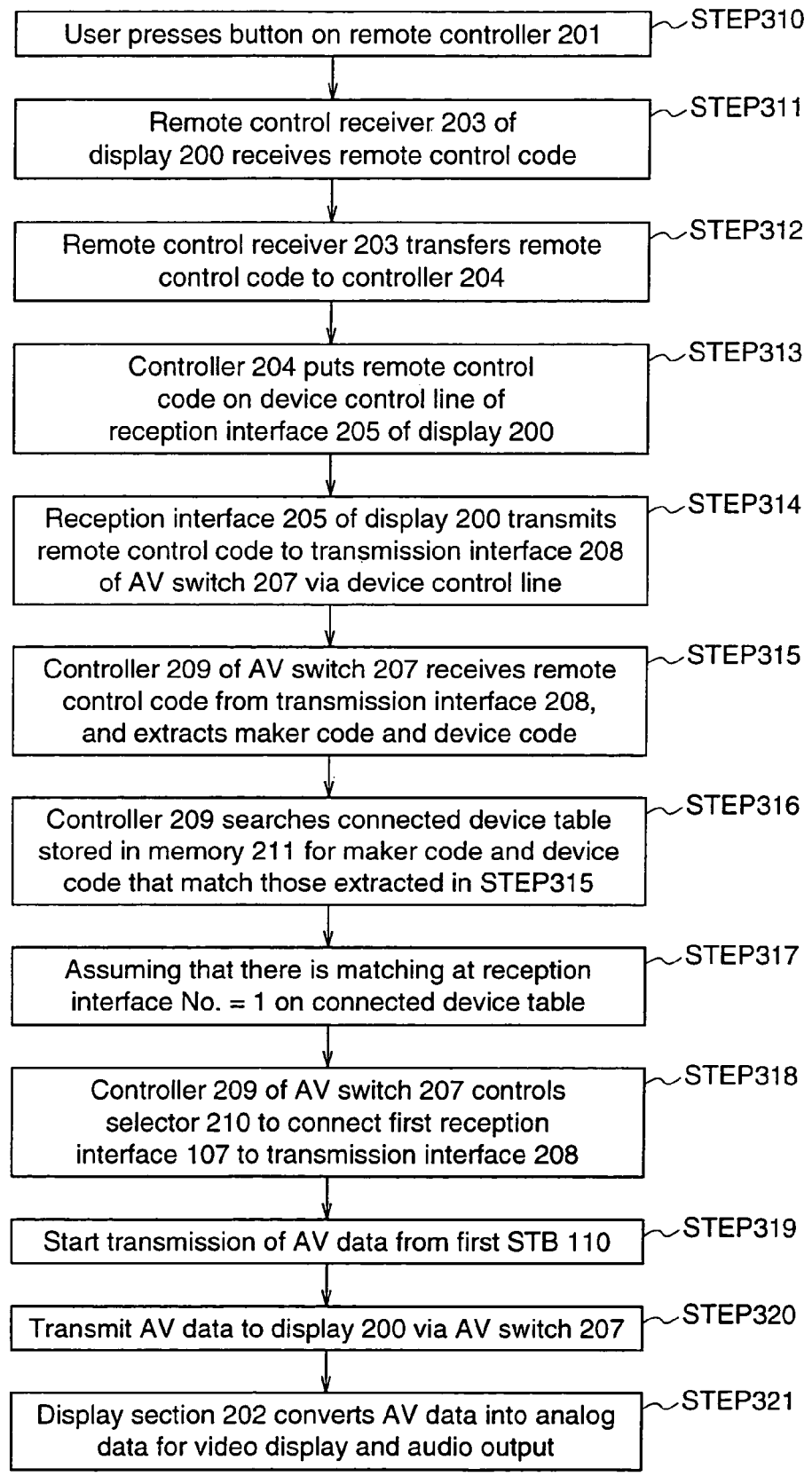
FIG. 16 is a diagram for explaining a connected device switching method according to the fourth embodiment of the invention.

Next, the latter half of the processing flow (connected device switching method) will be described with reference to FIG. 16. The latter half of the processing corresponds to the process steps from when the user presses a remote control button to when a connected device (STB) is selected to perform video display and audio output.

In STEP 310, the user presses the button on the remote controller 201.

In STEP 311, the remote control code outputted from the remote controller 201 is received by the remote control receiver 203 of the display 200.

In STEP 312, the remote control code is transmitted from the remote control receiver 203 to the controller 204 of the display 200.

In STEP 313, the controller 204 puts the remote control code on the device control line of the reception interface 205 of the display 200.

In STEP 314, the reception interface 205 of the display 200 transmits the remote control code to the transmission interface 208 of the AV switch 207 via the device control line.

In STEP 315, the controller 209 of the AV switch 207 receives the remote control code from the transmission interface 208, and extracts the maker code and device code.

In STEP 316, the controller 209 searches the connected-device table stored in the memory 211, for a maker code and a device code that match the maker code and the device code extracted in STEP 109.

In STEP 317, it is assumed that there is matching at the reception interface No. =1 on the connected-device table.

In STEP 318, the controller 209 controls the selector 210 to connect the first reception interface 107 to the transmission interface 208.

In STEP 319, transmission of AV data from the first STB 110 is started.

In STEP 320, the AV data is transmitted to the display 200 via the AV switch 207.

In STEP 321, the display section 202 converts the AV data into analog data to perform video display and audio output.

In the above-described processing, when the user presses the button on the remote controller which is associated with one of the connected devices, such as an STB, while aiming the remote controller at the display, video and audio from the device corresponding to the remote controller are automatically displayed and outputted.

According to the fourth embodiment of the present invention, when the first to third STBs 110~112 are connected to the AV switch 207 that is connected to the display 200 through the HDMI cable 206, each STB puts its maker code and device code on a portion of the video blanking period to transfer them to the AV switch 207. The AV switch 207 extracts the maker code and device code from the video blanking period, and creates a connected-device table. When the user presses the button on the remote controller, the display 200 receives the remote control code outputted from the remote controller, and transfers it to the AV switch 207. In the AV switch 207, the connected-device table is searched for a maker code and a device code that match the maker code and the device code included in the remote control code, and the selector 210 is controlled so that the reception interface 107 connected to the STB having the matching maker code and device code is connected to the transmission interface 208, and then AV data is transferred from the STB through the AV switch 207 to the display 200, wherein the AV data is displayed and reproduced by the display section 202. Therefore, by only pressing the button on the remote controller aiming at the display, the connected device corresponding to the remote controller is automatically selected, and the AV data from the selected device can be automatically displayed on the display. As a result, it becomes unnecessary for the user to specially operate the remote controller to select the connected device corresponding to the remote controller as in the conventional system, resulting in significant improvement in operability for the user.

In the first to fourth embodiments, each connected device starts transmission of AV data as the user presses the remote control button of the device, and displays the AV data on the display. However, not only the AV data but also video data such as OSD (On Screen Display) may be transmitted and displayed.

Further, in the first to fourth embodiments, the selected connected device may be operated according to the function of the pressed remote control button. For example, when the user presses a playback button on a remote controller of a DVD, a DVD corresponding to the remote controller is selected to start playback. When the user presses a button of a program table on a remote controller of an STB, an STB corresponding to the remote controller is selected to display the program table.

Furthermore, while in the first to fourth embodiments the device control line or the video blanking period is used for transmission of the remote control code, an I2C bus of a DDC line of an HDMI cable may be used, or some of them may be used in combination.

Embodiment 5

Hereinafter, an AV system according to a fifth embodiment of the present invention will be described. The difference between the fifth embodiment and the first embodiment is as follows. That is, while in the first embodiment identification of each connected device is carried out using the maker code and device code included in the remote control code, in this fifth embodiment it is carried out using ID information other than the maker code and device code.

The construction of the AV system according to the fifth embodiment is shown in FIG. 1. Since FIG. 1 has already been described for the first embodiment, repeated description is not necessary.

In this fifth embodiment, a vender ID table shown in FIG. 19 and a device address table shown in FIG. 20 are previously stored in the memory 106 of the display 100. The vender ID table is used to obtain a vender ID corresponding to a maker code, and the device address table is used to obtain a device address corresponding to the device code.

Hereinafter, the operation of the AV system according to the fifth embodiment will be described.

Figure 17:
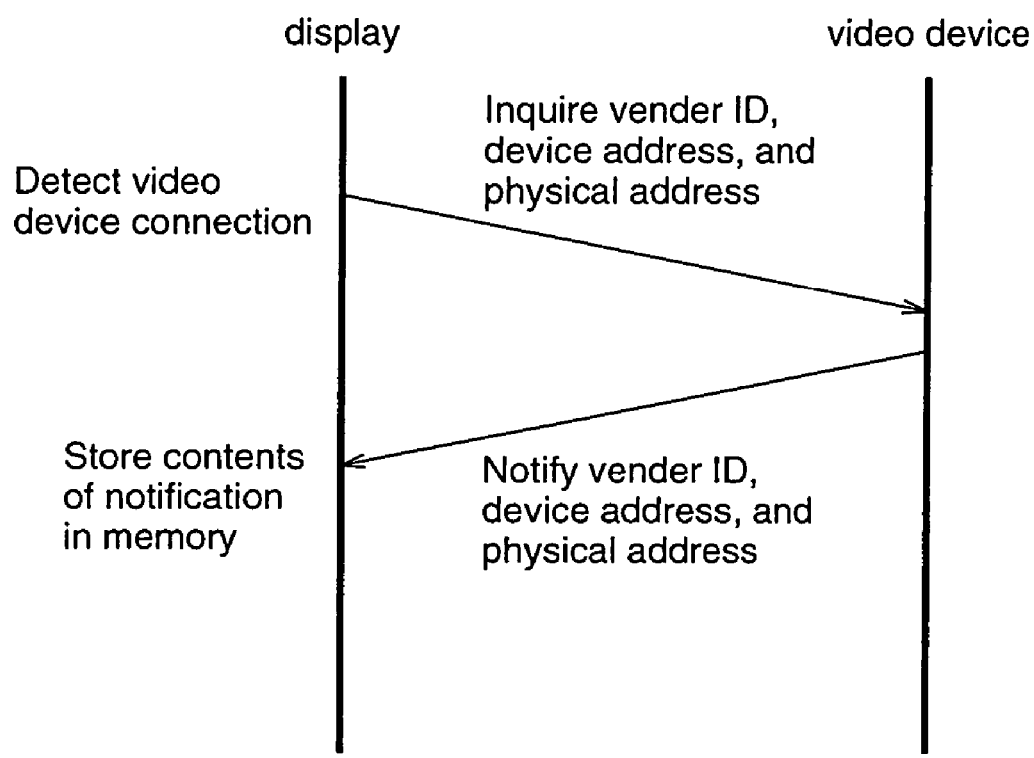
FIG. 17 is a diagram for explaining a connected device recognition method according to a fifth embodiment of the invention.

Initially, a method of recognizing a device connected to the display 100 will be described with reference to FIG. 17.

On the display 100 side, it is checked whether an external device is connected to each reception interface or not. For example, when it is recognized that the first STB 110 is connected to the first reception interface 107 through the HDMI cable 113, the display 100 inquires about the vender ID, device address, and physical address of the first STB 110. In response to the inquiry from the display 100, the first STB 110 notifies the display 100 of the vender ID, device address, and physical address that are stored in the memory 1003. Then, in the display 100, the contents of the notification from the first STB 110 is stored in the memory 106.

As described above, the vender ID, device address, and physical address of the first STB 110 are obtained. Further, as for the second STB 111 and the third STB 112, their vender IDs, device addresses, and physical addresses are obtained in like manner as mentioned above.

The memory 106 creates a connected-device table on the basis of the contents obtained in the above-described processing. The connected-device table is shown in FIG. 18. In FIG. 18, the physical address of the first STB 110 connected to the first reception interface 107 is "1", the physical address of the second STB 111 connected to the second reception interface 108 is "2", and the physical address of the third STB 112 connected to the third reception interface 109 is "3". The physical addresses may be assigned "1", "2", "3" in chronological order in which the respective STBs are connected. The manner of assigning the physical addresses is not restricted to those mentioned above.

Figure 21:
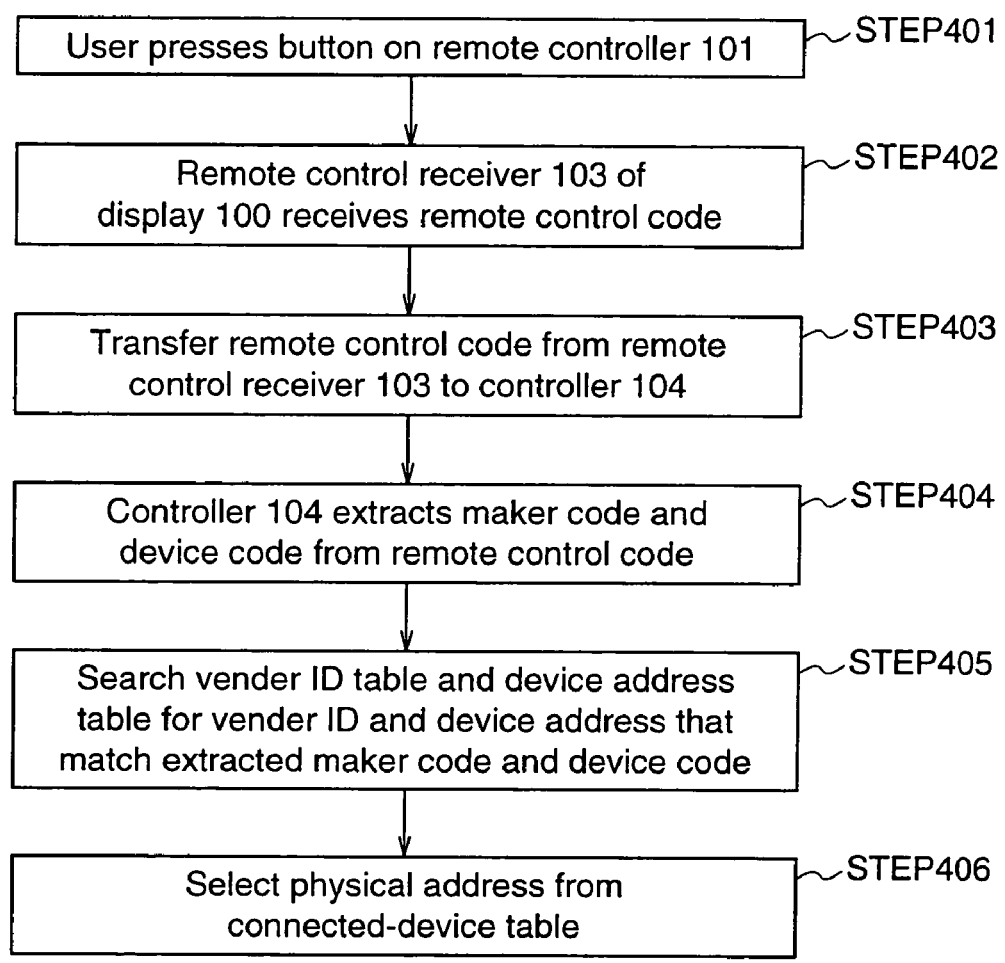
FIG. 21 is a diagram for explaining a connected device switching method according to the fifth embodiment of the present invention.

Next, a method of switching the connected devices according to this fifth embodiment will be described with reference to FIG. 21.

In STEP 401, the user presses the button on the remote controller 101.

In STEP 402, the remote control receiver 103 of the display 100 receives the remote control code outputted from the remote controller 101.

In STEP 403, the remote control receiver 103 transfers the remote control code to the controller 104.

In STEP 404, the controller 104 extracts the maker code and device code from the remote control code.

In STEP 405, the controller 104 searches the tables shown in FIGS. 19 and 20 for the vender ID and the device address which correspond to the maker code and the device code extracted in STEP 404, respectively.

In STEP 406, the physical address is selected from the connected-device table shown in FIG. 18 on the basis of the result of the search in STEP 405.

For example, assuming that the vender ID and the device address are "vender_id_1" and "kiki_addr_1", respectively, the physical address "1" is selected. Then, the controller 104 controls the selector 105 to connect the first reception interface 107 and the display section 102.

In the above-described processing, by only pressing the button on the remote controller associated with one of the connected devices with aiming the remote controller at the display 100, the connected device corresponding to the remote controller can be automatically selected, and further, the operation of the corresponding connected device can be controlled using the remote controller.

According to the fifth embodiment of the invention, when the first to third STBs 110~112 are connected to the display 100, the display 100 inquires the vender IDs, device addresses, and physical addresses of the respective STBs 110~112, and creates a connected-device table on the basis of the contents of notifications from the STBs 110~112. When the user presses the button on the remote controller, the display 100 receives the remote control code outputted from the remote controller, and obtains the vender ID and device address corresponding to the maker code and device code included in the remote control code from the vender ID table and the device address table that are previously stored. Then, the display 100 obtains the physical address from the connected-device table on the basis of the obtained vender ID and device address, and controls the selector 105 so that the reception interface connected to the STB corresponding to the physical address is connected to the display section 102. Therefore, by only pressing the remote control button aiming at the display, the STB corresponding to the remote controller can be automatically selected. As a result, it becomes unnecessary for the user to specially operate the remote controller to select the connected device corresponding to the remote controller, resulting in significant improvement in operability for the user.

Embodiment 6

Hereinafter, an AV system according to a sixth embodiment of the present invention will be described. This sixth embodiment is different from the fifth embodiment in that the AV switch is separated from the display while the function of the AV switch is included in the display in the fifth embodiment.

The construction of the AV system according to the sixth embodiment is shown in FIG. 9. Since FIG. 9 has already been described for the second embodiment, repeated description is not necessary.

In this sixth embodiment, the vender ID table shown in FIG. 19 and the device address table shown in FIG. 20 are previously stored in the memory 211 of the AV switch 207.

Next, the operation of the AV system according to the sixth embodiment will be described. The method of recognizing the devices connected to the AV switch 207 according to this sixth embodiment is almost identical to the method described for the fifth embodiment, except that the created connected-device table (shown in FIG. 18) is stored in the memory 211 of the AV switch 207.

Figure 22:
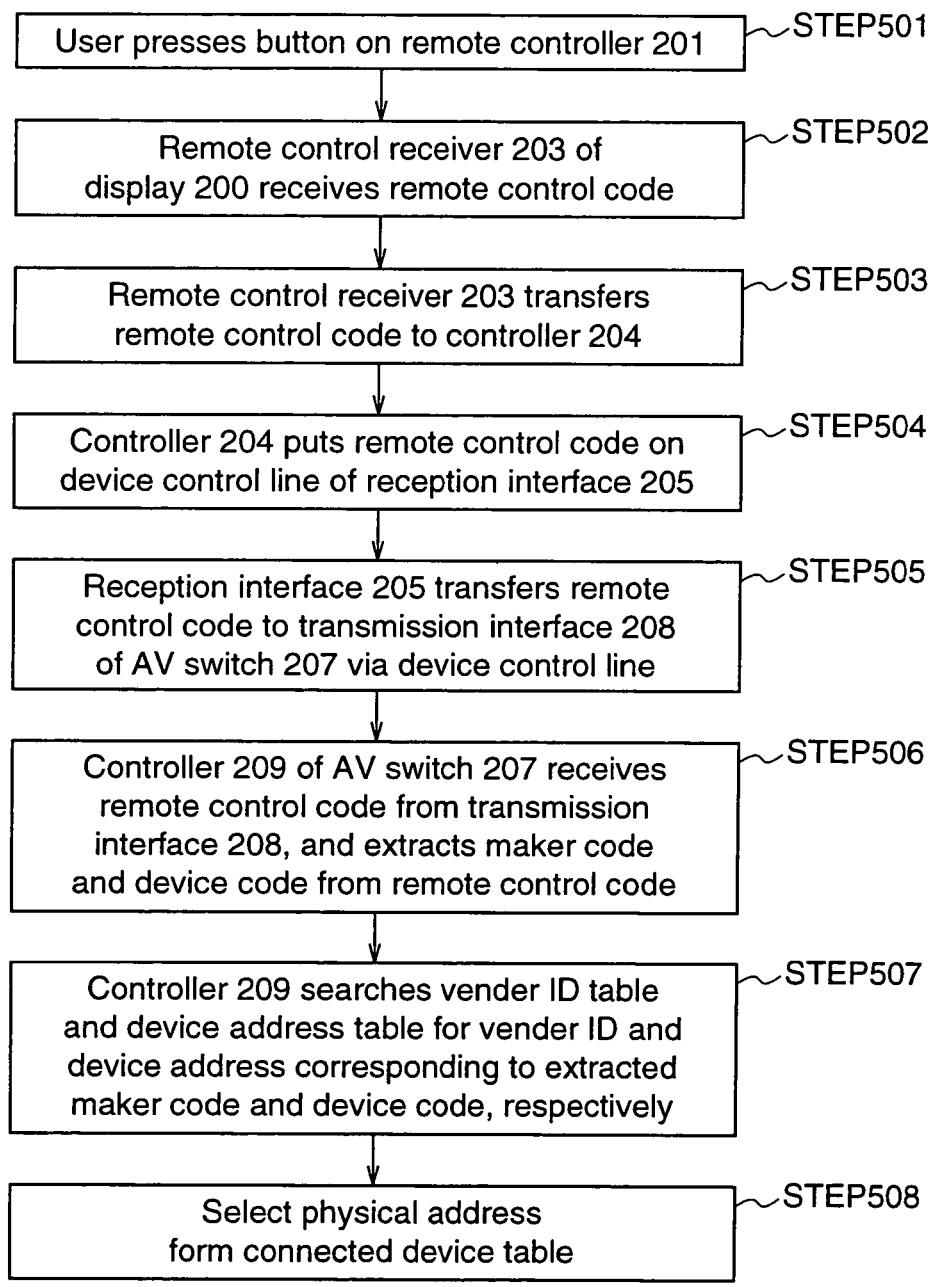
FIG. 22 is a diagram for explaining a connected device switching method according to a sixth embodiment of the present invention.

Hereinafter, the connected device switching method according to the sixth embodiment will be described with reference to FIG. 22.

In STEP 501, the user presses the button on the remote controller 201.

In STEP 502, the remote control receiver 203 of the display 200 receives the remote control code outputted from the remote controller 201.

In STEP 503, the remote control receiver 203 transfers the remote control code to the controller 204 of the display 200.

In STEP 504, the controller 204 puts the remote control code on the device control line of the reception interface 205 of the display.

In STEP 505, the reception interface 205 of the display transfers the remote control code to the transmission interface 208 of the AV switch 207 via the device control line.

In STEP 506, the controller 209 of the AV switch 207 receives the remote control code from the transmission interface 208, and extracts the maker code and device code from the remote control code.

In STEP 507, the controller 209 searches the tables shown in FIGS. 19 and 20 for the vender ID and device address corresponding to the maker code and device code extracted in STEP 506.

In STEP 508, the controller 209 selects the physical address from the connected-device table shown in FIG. 18 on the basis of the result of the search in STEP 507. For example, assuming that the vender ID and the device address are "vender_id_1" and "kiki_addr_1", respectively, the physical address "1" is selected. Then, the controller 209 controls the selector 210 to connect the output of the first reception interface 107 to the transmission interface 208.

In the above-described processing, by only pressing the button on the remote controller associated with one of the connected devices with aiming the remote controller at the display, the device corresponding to the remote controller can be automatically selected.

According to the sixth embodiment of the present invention, when the first to third STBs 110~112 are connected to the AV switch 207 that is connected to the display 200 through the HDMI cable 206, the AV switch 207 inquires the vender IDs, device addresses, and physical addresses of the respective STBs, and creates a connected-device table on the basis of the notifications from the respective STBs. When the user presses the button on the remote controller, the display 200 receives the remote control code outputted from the remote controller, and transfers it to the AV switch 207. In the AV switch 207, the vender ID and device address corresponding to the maker code and device code included in the remote control code are obtained from the previously stored vender ID table and device address table, and the physical address is obtained from the connected-device table on the basis of the obtained vender ID and device address, and then the selector 210 is controlled so that the reception interface connected to the STB corresponding to the physical address is connected to the transmission interface 208. Therefore, by only pressing the button on the remote controller aiming at the display, the STB corresponding to the remote controller can be automatically selected. As a result, it becomes unnecessary for the user to specially operate the remote controller to select the connected device corresponding to the remote controller as in the conventional system, resulting in significant improvement in operability for the user.

Embodiment 7

Hereinafter, an AV system according to a seventh embodiment of the present invention will be described.

The difference between the seventh embodiment and the fifth embodiment is as follows. That is, while in the fifth embodiment the connected device corresponding to the remote controller pressed by the user is identified at the display side and then the selector 105 is controlled, in this seventh embodiment the selector 105 is controlled from the connected device side corresponding to the remote controller pressed by the user.

Next, the operation of the AV system according to the seventh embodiment will be described. Since the method of recognizing the devices connected to the display 100 according to this seventh embodiment is identical to that described for the fifth embodiment, repeated description is not necessary.

Figure 23:
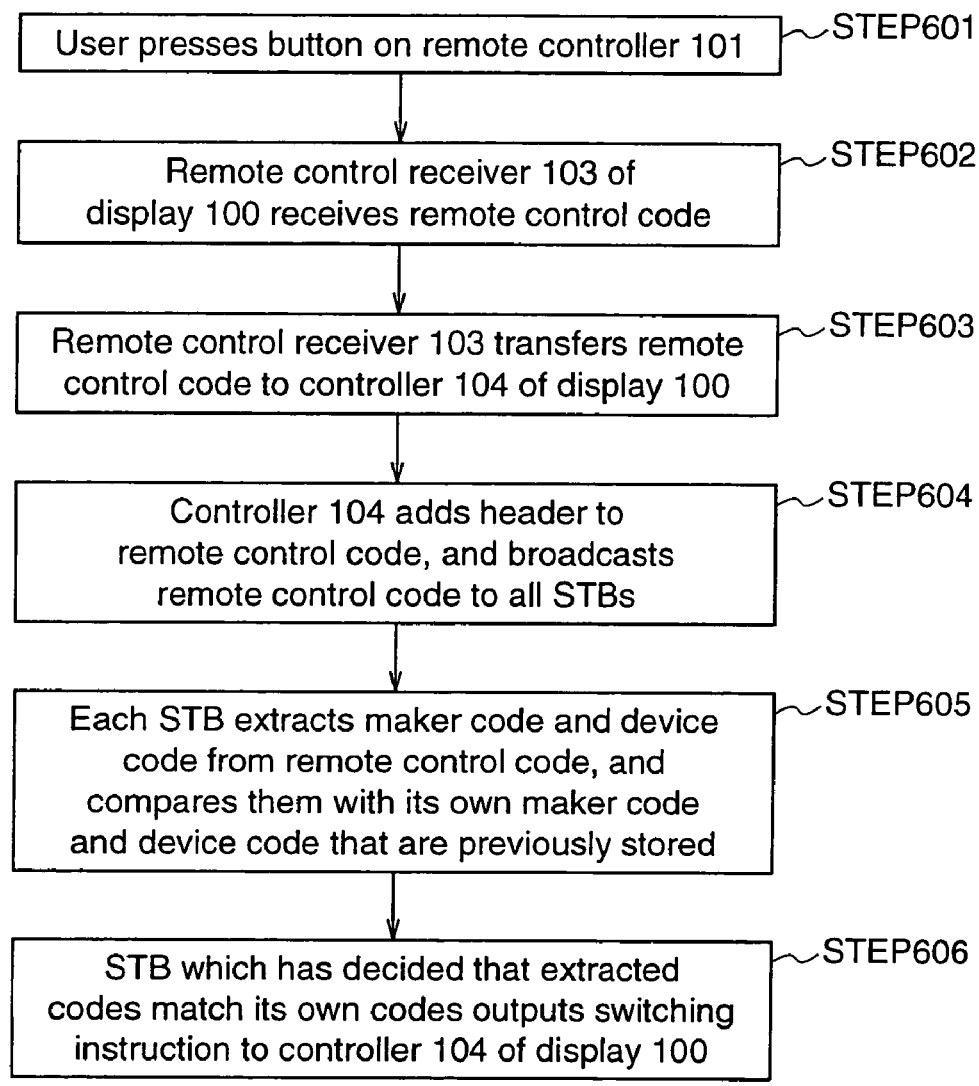
FIG. 23 is a diagram for explaining a connected device switching method according to a seventh embodiment of the invention.

Hereinafter, the connected device switching method according to this seventh embodiment will be described with reference to FIG. 23.

In STEP 601, the user presses the button on the remote controller 101.

In STEP 602, the remote control receiver 103 of the display 100 receives the remote control code outputted from the remote controller 101.

In STEP 603, the remote control receiver 103 transfers the remote control code to the controller 104.

Figure 24:
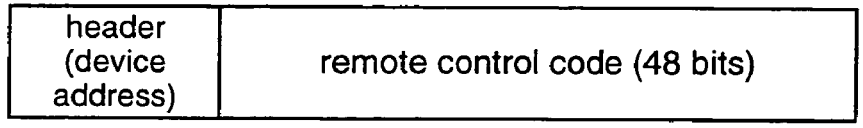
FIG. 24 is a diagram illustrating a format of a signal to be broadcast to all video devices in an AV system according to the seventh and eighth embodiments of the present invention.

In STEP 604, the controller 104 adds a header to the remote control code as shown in FIG. 24, and transmits (broadcasts) the remote control code to all STBs in unison.

In STEP 605, each STB checks as to whether the remote control code received from the display 100 is directed to itself or not. That is, the STB extracts the maker code and device code from the remote control code, and compares them with its own maker code and device code that are previously stored. When there is matching, the STB decides that the remote control code is directed to itself.

In STEP 606, the STB which has decided that the remote control code is directed to itself outputs a switching instruction to the controller 104 of the display 100 through the device control line of the HDMI cable. For example, assuming that the maker code and device code of the first STB 110 match the maker code and device code included in the remote control code, the first STB 110 outputs a switching instruction to the display 100 through the device control line of the HDMI cable 113. Then, the controller 104 controls the selector 105 according to the instruction from the first STB 110 to connect the first reception interface 107 to the display 102.

In the above-described processing, by only pressing the button on the remote controller associated with one of the connected devices while aiming the remote controller at the display, the selector 105 can be automatically controlled so as to select the device corresponding to the remote controller.

According to the seventh embodiment of the present invention, when the user presses the button on the remote controller, the display 100 receives the remote control code outputted from the remote controller, adds a header to the remote control code, and broadcasts the remote control code to all the STBs. Each STB checks as to whether the remote control code is directed to itself or not on the basis of the maker code and device code included in the remote control code, and the STB which decides that the remote control code is directed to itself outputs a switching instruction to the display 100. Therefore, by only pressing the button on the remote controller aiming at the display, the STB corresponding to the remote controller can be automatically selected. As the result, it becomes unnecessary for the user to specially control the remote controller to select the connected device corresponding to the remote controller as in the conventional system, resulting in significant improvement in operability for the user.

Embodiment 8

Hereinafter, an AV system according to an eighth embodiment of the present invention will be described. This eighth embodiment is different from the seventh embodiment in that the AV switch is separated from the display in this eighth embodiment while the function of the AV switch is included in the display in the seventh embodiment.

The construction of the AV system according to the eighth embodiment is shown in FIG. 9. Since FIG. 9 has already been described with respect to the second embodiment, repeated description is not necessary.

Figure 10:
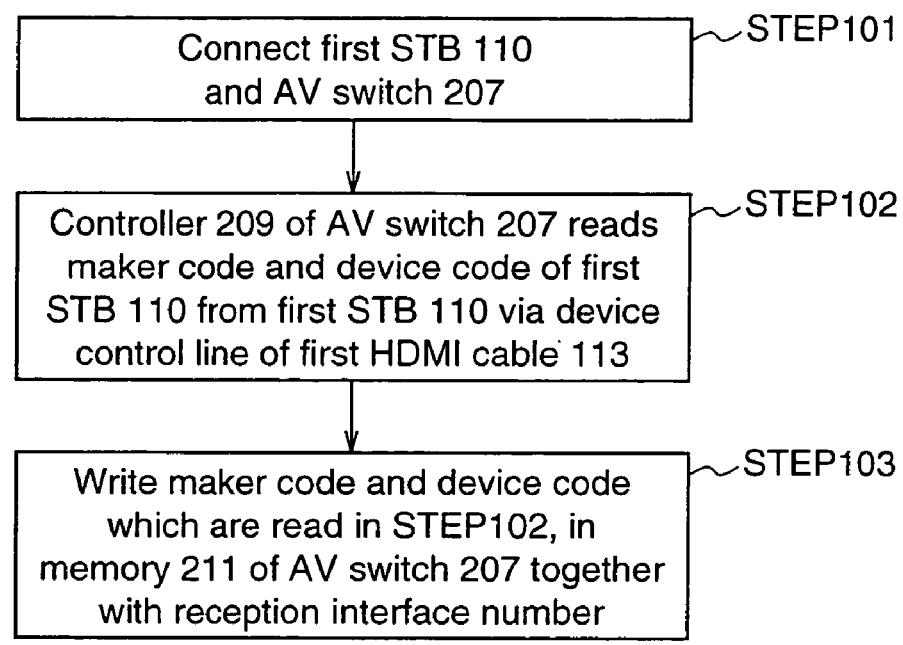
FIG. 10 is a diagram for explaining a connected device recognition method according to the second embodiment of the invention.

In this eighth embodiment, the vender ID table shown in FIG. 10 and the device address table shown in FIG. 20 are previously stored in the memory 211 of the AV switch 207.

Next, the operation of the AV system according to the eighth embodiment will be described. Since the method of recognizing the devices connected to the AV switch 207 according to this eighth embodiment is identical to that described for the sixth embodiment, repeated description is not necessary.

Figure 25:
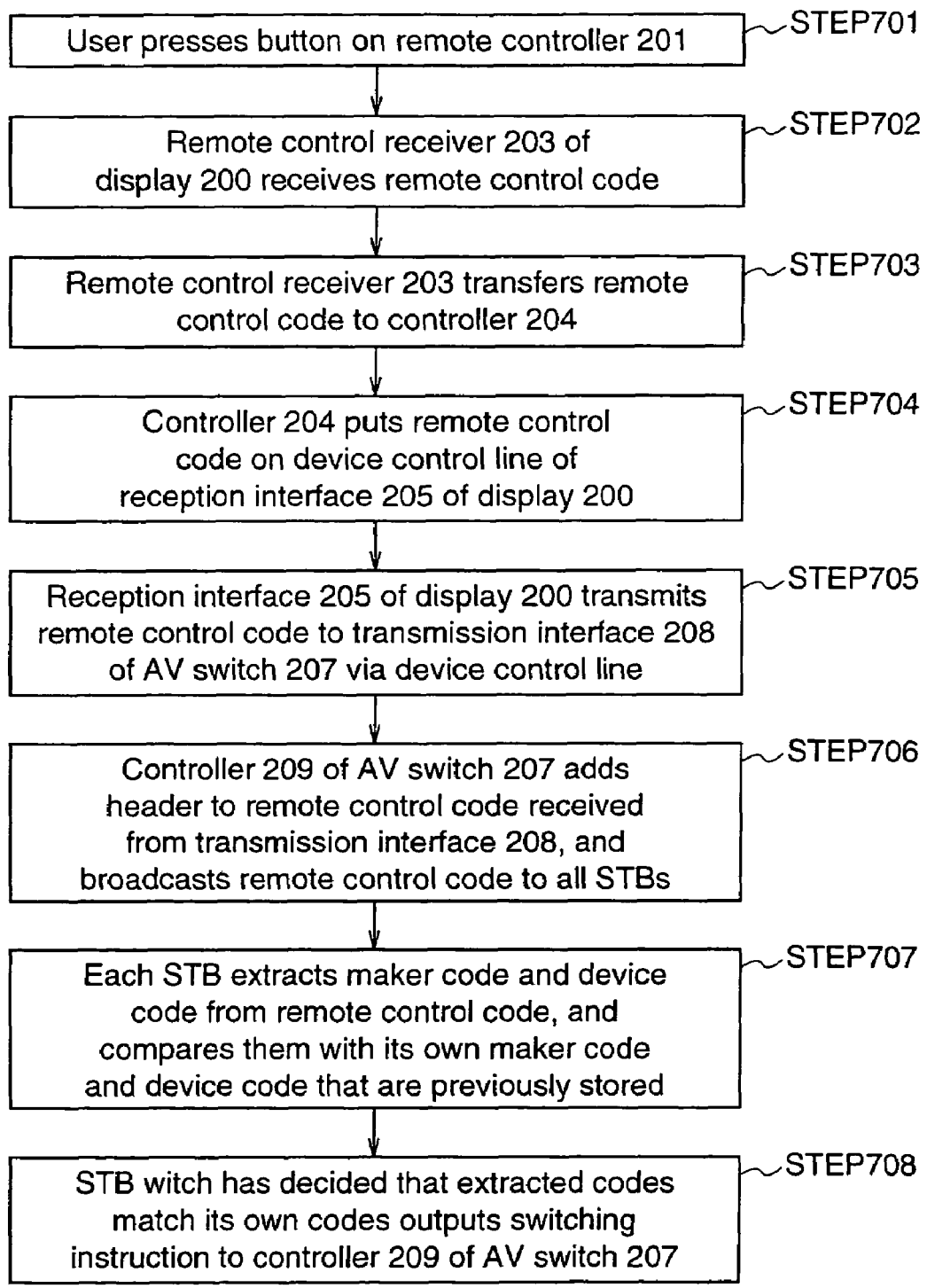
FIG. 25 is a diagram for explaining a connected device switching method according to the eighth embodiment of the invention.

Hereinafter, the connected device switching method according to this eighth embodiment will be described with reference to FIG. 25.

In STEP 701, the user presses the button on the remote controller 201.

In STEP 702, the remote control receiver 203 of the display 200 receives the remote control code outputted from the remote controller 201.

In STEP 703, the remote control receiver 203 transfers the remote control code to the controller 204.

In STEP 704, the controller 204 puts the remote control code on the device control line of the reception interface 205.

In STEP 705, the reception interface 205 transfers the remote control code to the transmission interface 208 of the AV switch 207 through the device control line.

In STEP 706, the controller 209 of the AV switch 207 adds a header to the remote control code received from the transmission interface 208, as shown in FIG. 24, and broadcasts the remote control code to all STBs.

In STEP 707, each STB checks as to whether the remote control code received from the AV switch 207 is directed to itself or not. That is, the STB extracts the maker code and device code from the remote control code, and compares them with its own maker code and device code that are previously stored. When there is matching, the STB decides that the remote control code is directed to itself.

In STEP 708, the STB which has decided that the remote control code is directed to itself outputs a switching instruction to the controller 209 of the AV switch 207 through the device control line of the HDMI cable. For example, assuming that the maker code and device code of the first STB 110 match the maker code and device code included in the remote control code, the first STB 110 outputs a switching instruction to the AV switch 207 through the device control line of the HDMI cable 113. Then, the controller 209 controls the selector 210 according to the instruction from the first STB 110 to connect the first STB 110 to the transmission interface 208.

In the above-described processing, by only pressing the button on the remote controller associated with one of the connected devices while aiming the remote controller at the display 200, the selector 210 can be automatically controlled so as to select the device corresponding to the remote controller.

According to the eighth embodiment of the present invention, when the user presses the button on the remote controller, the display 200 receives the remote control code outputted from the remote controller and transfers it to the AV switch 207, and the AV switch 207 adds a header to the remote control code and broadcasts the remote control code to all the STBs. Each STB checks as to whether the remote control code is directed to itself or not on the basis of the maker code and device code included in the remote control code, and the STB which decides that the remote control code is directed to itself outputs a switching instruction to the AV switch 207. Therefore, by only pressing the button on the remote controller aiming at the display, the STB corresponding to the remote controller can be automatically selected. As the result, it becomes unnecessary for the user to specially operate the remote controller to select the connected device corresponding to the remote controller as in the conventional system, resulting in significant improvement in operability for the user.

In the seventh and eighth embodiments, when each STB checks as to whether the remote control code is directed to itself or not, the STB uses the maker code and device code included in the remote control code. However, each STB may use the device address included in the header and the vender ID corresponding to the maker code included in the remote control code.

Embodiment 9

Hereinafter, an AV system according to a ninth embodiment of the present invention will be described.

The AV system according to the ninth embodiment is shown in FIG. 1. Since FIG. 1 has already been described with respect to the first embodiment, repeated description is not necessary.

Next, the operation of the AV system according to the ninth embodiment will be described. In this ninth embodiment, the display 100 performs recognition of the respective connected devices using one of the methods described for the first, third, and fifth embodiments.

Figure 26:
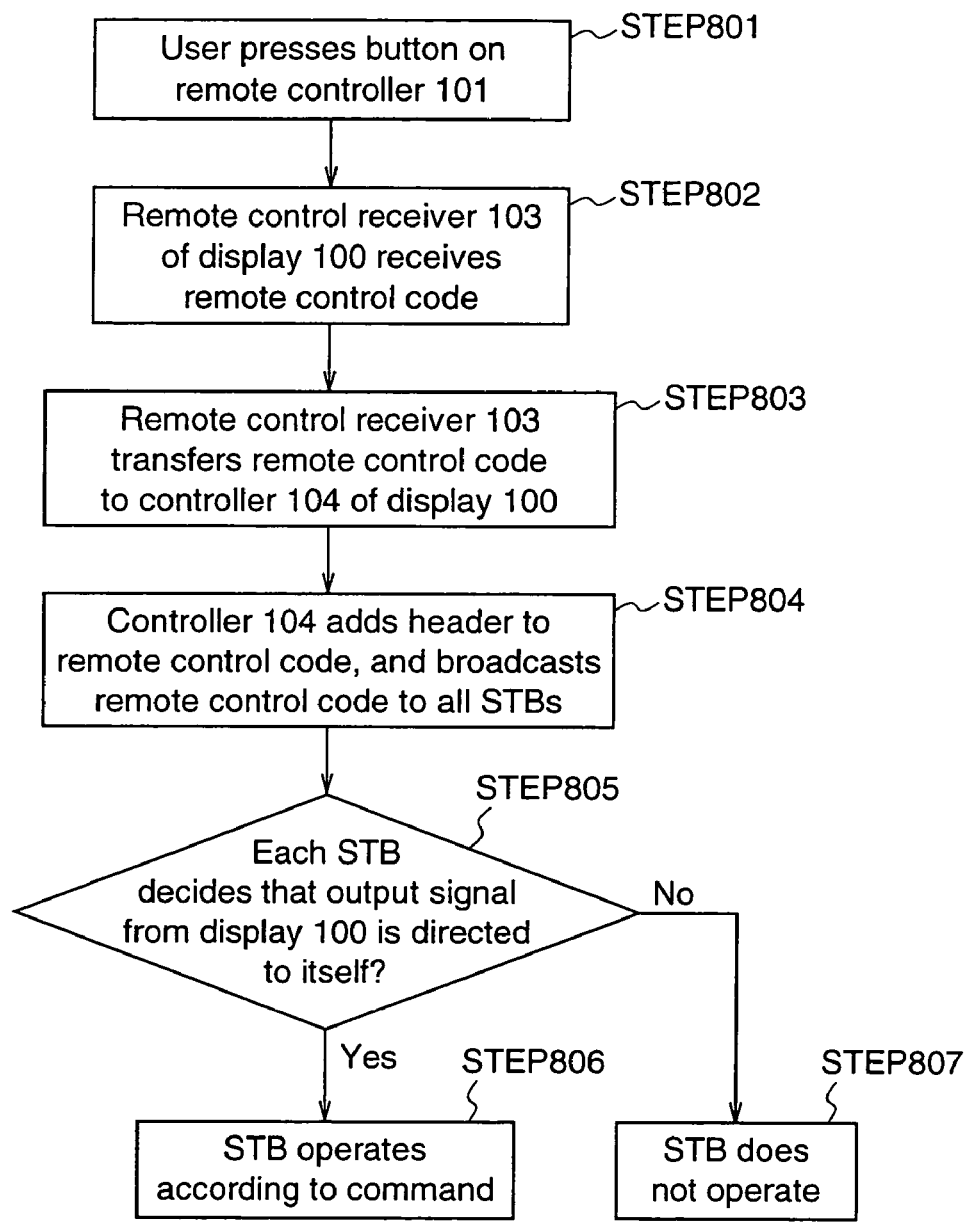
FIG. 26 is a diagram for explaining a connected device operation controlling method according to a ninth embodiment of the present invention.

Hereinafter, the connected device controlling method will be described with reference to FIG. 26.

In STEP 801, the user presses the button on the remote controller 101.

In STEP 802, the remote control receiver 103 of the display 100 receives the remote control code outputted from the remote controller 101.

In STEP 803, the remote control receiver 103 transfers the remote control code to the controller 104.

Figure 27:
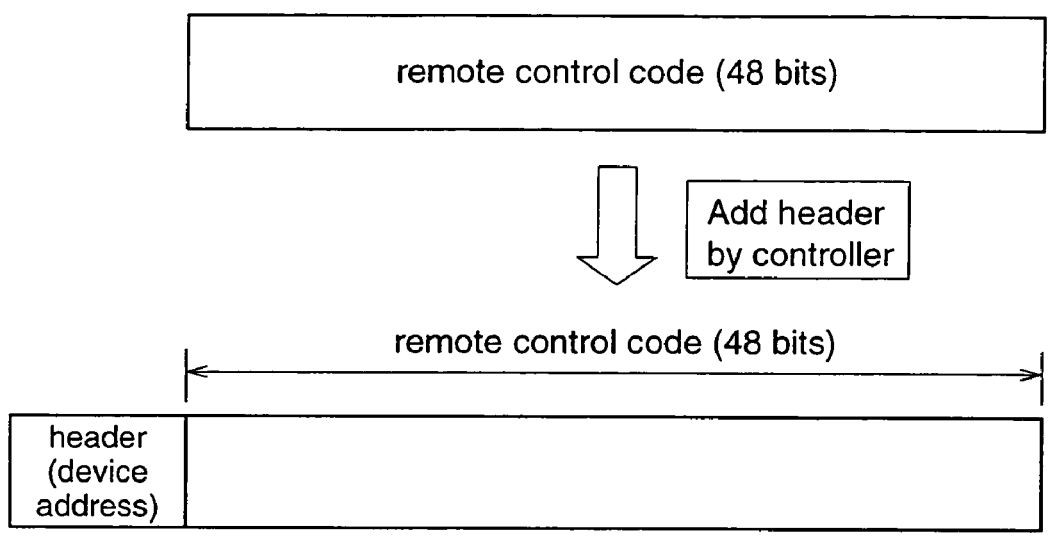
FIG. 27 is a diagram illustrating an example of a format of a signal to be outputted to a connected device when controlling the operation of the connected device in the AV system of the invention.

In STEP 804, the controller 104 adds a header to the remote control code as shown in FIG. 27, and broadcasts the remote control code to all STBs.

In STEP 805, each STB checks as to whether the output signal from the display 100 is directed to itself or not on the basis of the device address included in the header of the signal received from the display 100. When the STB decides that the remote control code is directed to itself, the STB goes to STEP 806 and execute the operation according to the command included in the remote control code. On the other hand, when the STB decides that the remote control code is not directed to itself, the STB goes to STEP 807 and does not execute the operation.

In the above-described processing, by only pressing the button on the remote controller associated with one of the connected devices while aiming the remote controller at the display 100, the device corresponding to the remote controller can perform the operation desired by the user.

When the user wants to display AV data of a desired connected device, the user can change the display screen by the switching method described for any of the first, third, fifth, and seventh embodiments, using the remote controller corresponding to the desired connected device.

According to the ninth embodiment of the present invention, when the user presses the button on the remote controller, the display 100 receives the remote control code outputted from the remote controller, adds a header to the remote control code, and broadcasts the remote control code to all the STBs. Each STB checks as to whether the remote control code is directed to itself or not on the basis of the device address included in the header, and the STB which decides that the remote control code is directed to itself performs the operation according to the command included in the remote control code. Therefore, the remote control operation for the video device can be performed while aiming the remote controller at the display.

Embodiment 10

Hereinafter, an AV system according to a tenth embodiment of the present invention will be described.

The AV system according to the tenth embodiment is shown in FIG. 9. Since FIG. 9 has already been described with respect to the second embodiment, repeated description is not necessary.

Next, the operation of the AV system according to the tenth embodiment will be described. In this tenth embodiment, recognition of the connected devices is carried out according to one of the methods described for the second, fourth, and sixth embodiments.

Figure 28:
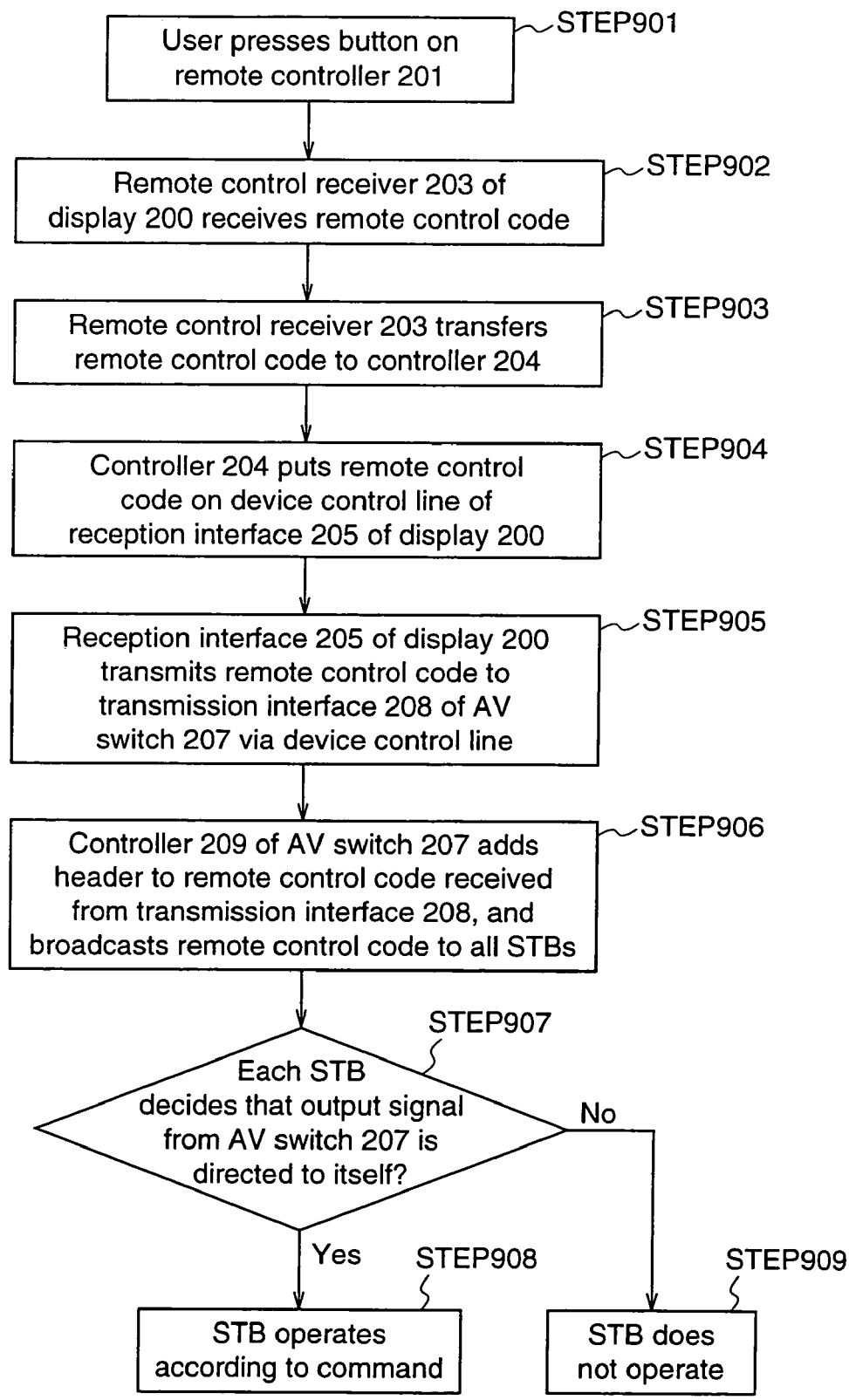
FIG. 28 is a diagram for explaining a connected device operation controlling method according to a tenth embodiment of the present invention.

Hereinafter, the connected device controlling method will be described with reference to FIG. 28.

In STEP 901, the user presses the button on the remote controller 201.

In STEP 902, the remote control receiver 203 of the display 200 receives the remote control code outputted from the remote controller 201.

In STEP 903, the remote control receiver 203 transfers the remote control code to the controller 204.

In STEP 904, the controller 204 puts the remote control code on the device control line of the reception interface 205.

In STEP 905, the reception interface 205 transfers the remote control code to the transmission interface 208 of the AV switch 207 through the device control line.

In STEP 906, the controller 209 of the AV switch 207 receives the remote control code from the transmission interface 208, adds a header to the remote control code as shown in FIG. 27, and broadcasts the remote control code to all STBs.

In STEP 907, each STB checks as to whether the output signal from the AV switch 207 is directed to itself or not on the basis of the device address included in the header of the signal received from the AV switch 207. When the STB decides that the remote control code is directed to itself, the STB goes to STEP 908 and execute the operation according to the command included in the remote control code. On the other hand, when the STB decides that the remote control code is not directed to itself, the STB goes to STEP 909 and does not execute the operation.

In the above-described processing, by only pressing the button on the remote controller associated with one of the connected devices with aiming the remote controller at the display 200, the device corresponding to the remote controller can execute the operation desired by the user.

When the user wants to display AV data of a desired connected device on the display section 202, the user can change the display screen by the switching method described for any of the second, fourth, sixth, and eighth embodiments, using the remote controller corresponding to the desired connected device.

According to the tenth embodiment of the present invention, when the user presses the button on the remote controller, the display 200 receives the remote control code outputted from the remote controller and transfers it to the AV switch 207. Then, the AV switch 207 adds a header to the remote control code, and broadcasts the remote control code to all the STBs. Each STB checks as to whether the remote control code is directed to itself or not on the basis of the device address included in the header, and the STB which decides that the remote control code is directed to itself performs the operation according to the command included in the remote control code. Therefore, the remote control operation for the video device can be performed while aiming the remote controller at the display.

Figure 29:
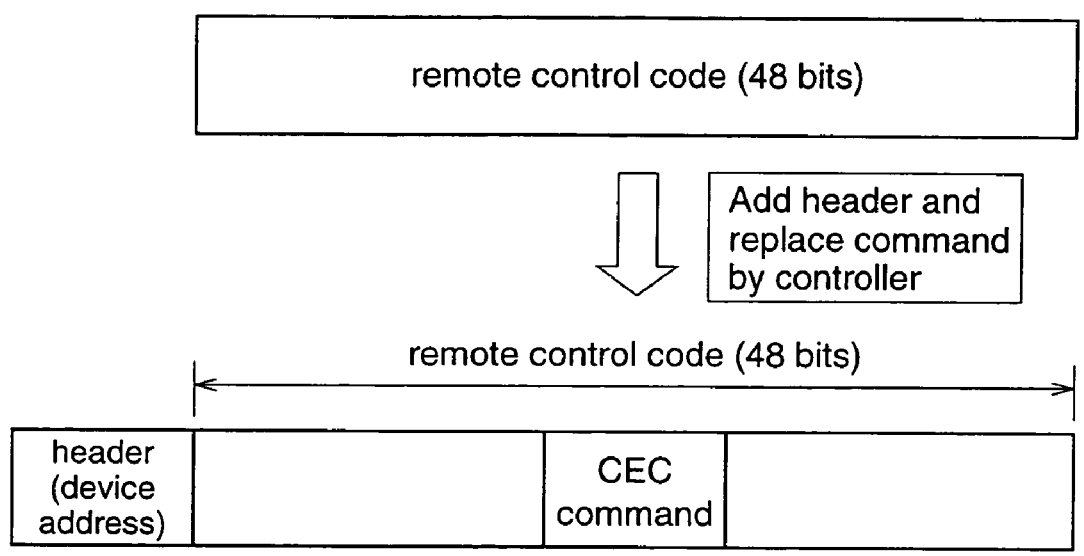

In the ninth and tenth embodiments, the controller 104 of the display 100 or the controller 209 of the AV switch 207 adds the header to the remote control code, and broadcasts the remote control code. However, the controller 104 or 209 may add a device control command as well as the header to the remote control code, thereby to operate the corresponding connected device according to the device control command. Further, the device control command may be added to the top or the end of the remote code, or it may be inserted in the remote control code by replacing the command portion of the remote control code with the device control command as shown in FIG. 29.

Embodiment 11

Hereinafter, an AV system according to an eleventh embodiment of the present invention will be described.

The AV system according to the eleventh embodiment is shown in FIG. 1. Since FIG. 1 has already been described with respect to the first embodiment, repeated description is not necessary.

Next, the operation of the AV system according to the eleventh embodiment will be described. In this eleventh embodiment, recognition of the respective devices connected to the display is carried out using any of the methods described for the first, third, and fifth embodiments.

In this eleventh embodiment, although device control by remote control is carried out, video and audio are not switched willingly. As examples of this operation, there are recording, fast forward, and fast reverse of a VTR, a DVD recorder, and the like. A remote control command for performing such operation is called a switching disable command.

Figures 30, 31:
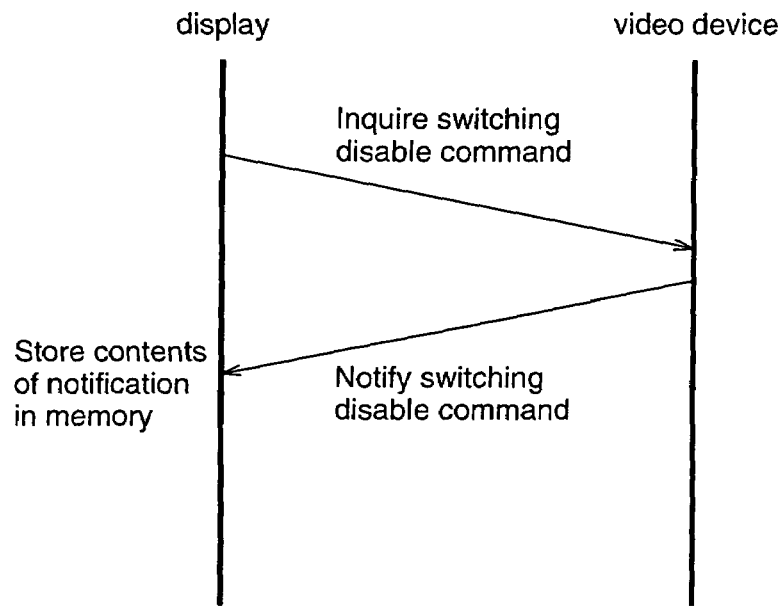
FIG. 30 is a diagram for explaining a switching disable command acquisition method according to an eleventh embodiment of the present invention.
FIG. 31 is a diagram illustrating a switching disable command table.

Initially, the method of creating a switching disable command table will be described with reference to FIG. 30. This processing is carried out before or after recognition of the connected devices.

The display 100 makes inquiries about switching disable commands to the respective connected devices, and the connected devices notify the display 100 of the switching disable commands which have previously been set by the makers. Then, the display 100 creates a table of commands for disabling switching of the display screen on the basis of the contents of the notifications, as shown in FIG. 31. This switching disable command table is stored in the memory 106 of the display 100.

Figure 32:
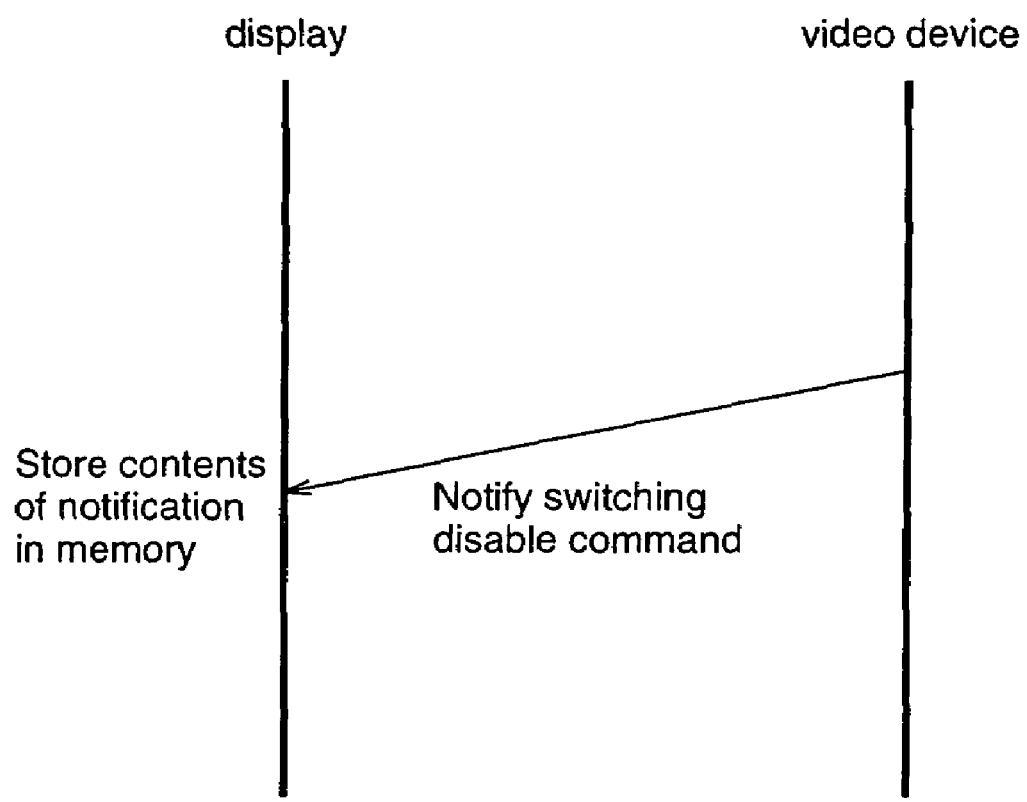
FIG. 32 is a diagram for explaining a switching disable command acquisition method according to the eleventh embodiment of the invention.

While in the above description the display obtains the switching disable commands from the respective connected devices by making the inquiries, the connected devices may voluntarily notify the switching disable commands as shown in FIG. 32.

Figure 33:
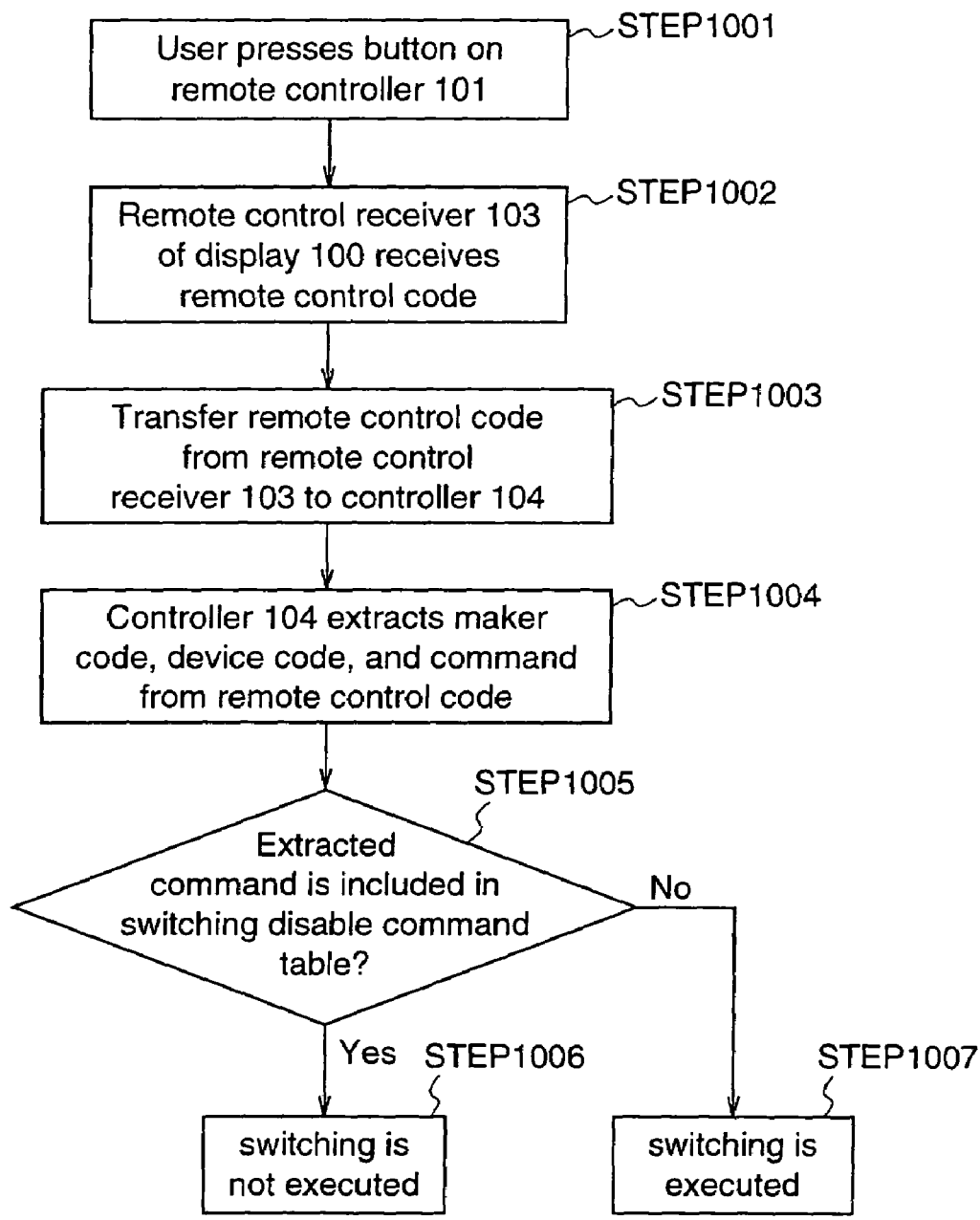
FIG. 33 is a diagram for explaining a connected device switching method according to the eleventh embodiment of the invention.

Next, the connected device switching method according to the eleventh embodiment will be described with reference to FIG. 33.

In STEP 1001, the user presses the button on the remote controller 101.

In STEP 1002, the remote control receiver 103 of the display 100 receives the remote control code outputted from the remote controller 101.

In STEP 1003, the remote control receiver 103 transfers the remote control code to the controller 104.

In STEP 1004, the controller 104 extracts the maker code, device code, and command from the remote control code.

In STEP 1005, the controller 104 searches the switching disable command table for the command extracted in STEP 1004. When the switching disable command is detected as the result of the search, the controller 104 goes to STEP 1006 and does not perform switching. When the switching disable command is not detected, the controller 104 goes to STEP 1007 and performs switching.

According to the eleventh embodiment of the invention, the switching disable commands that have previously been set by the makers are obtained from the respective STBs before or after performing recognition of the STBs to create the switching disable command table, and the selector 105 does not perform switching when the remote control code outputted from the remote controller includes a switching disable command on the switching disable command table. Therefore, useless operation is avoided when performing remote control operation in which switching of the display screen is not required, such as recording, fast forward, or fast reverse.

Embodiment 12

Hereinafter, an AV system according to a twelfth embodiment of the present invention will be described.

The AV system according to the twelfth embodiment is shown in FIG. 9. Since FIG. 9 has already been described with respect to the second embodiment, repeated description is not necessary.

Next, the operation of the AV system according to the twelfth embodiment will be described. In this twelfth embodiment, recognition of the respective connected devices is carried out according to any of the methods described for the second, fourth, and sixth embodiments.

Figure 34:
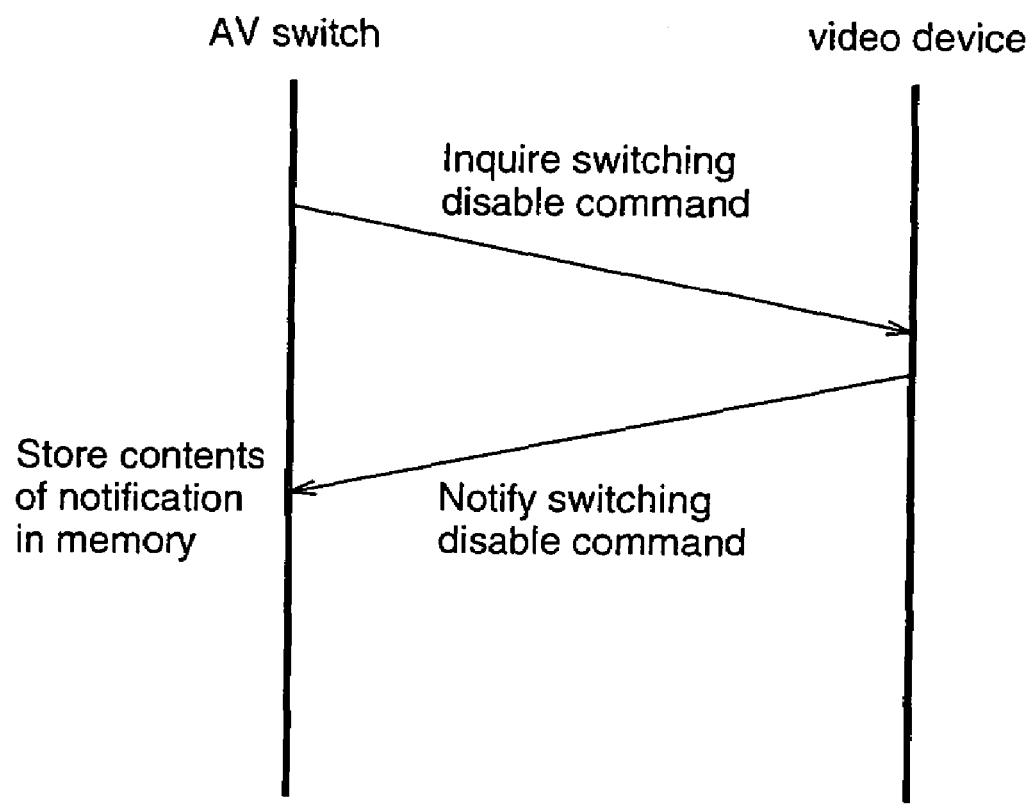
FIG. 34 is a diagram illustrating a switching disable command acquisition method according to a twelfth embodiment of the present invention.

Initially, the method of creating a switching disable command table will be described with reference to FIG. 34.

The AV switch 207 makes inquiries about switching disable commands to the respective connected devices, and the connected devices notify the AV switch 207 of the switching disable commands which have previously been set by the makers. Then, the AV switch 207 creates a table of commands for disabling switching of the display screen on the basis of the contents of the notifications, as shown in FIG. 31, and stores the table in the memory 211 of the AV switch 207.

While in the above description the AV switch obtains the switching disable commands from the respective connected devices by making the inquiries, the connected devices may voluntarily notify the switching disable commands.

Figure 35:
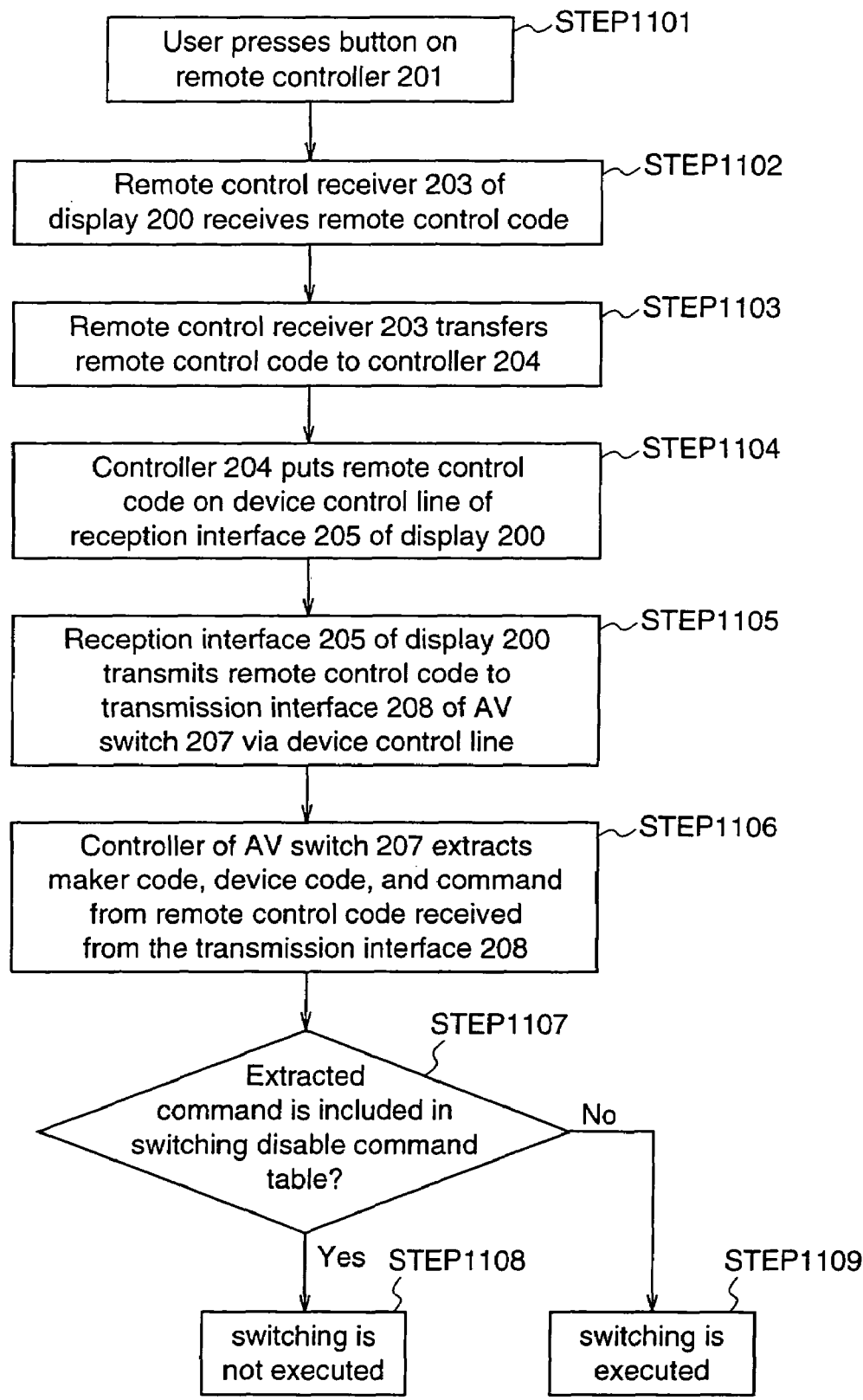
FIG. 35 is a diagram for explaining a connected device switching method according to the twelfth embodiment of the invention.
Figure 37:
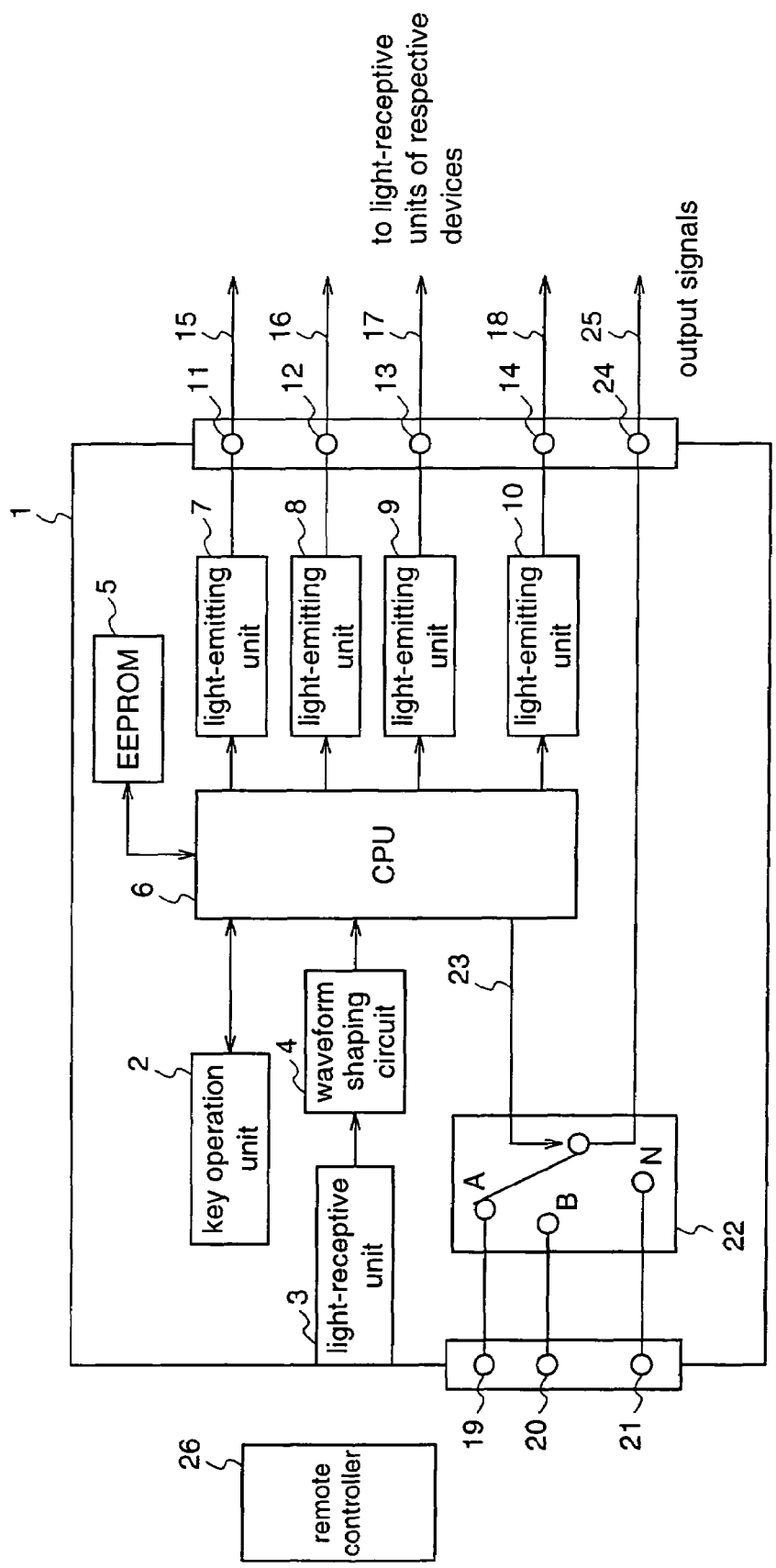
FIG. 37 is a diagram illustrating the construction of the conventional AV system.

Next, the connected device switching method according to the twelfth embodiment will be described with reference to FIG. 35.

In STEP 1101, the user presses the button on the remote controller 201.

In STEP 1102, the remote control receiver 203 of the display 200 receives the remote control code outputted from the remote controller 201.

In STEP 1103; the remote control receiver 203 transfers the remote control code to the controller 204.

In STEP 1104, the controller 204 puts the remote control code on the device control line of the reception interface 205.

In STEP 1105, the reception interface 205 transfers the remote control code to the transmission interface 208 of the AV switch 207 through the device control line.

In STEP 1106, the controller 209 of the AV switch 207 receives the remote control code from the transmission interface 208, and extracts the maker code, device code, and command from the remote control code.

In STEP 1107, the controller 209 searches the switching disable command table for the command extracted in STEP 1106. When the switching disable command is detected as the result of the search, the controller 209 goes to STEP 1108 and does not perform switching. When the switching disable command is not detected, the controller 209 goes to STEP 1109 and performs switching.

According to the twelfth embodiment of the invention, the switching disable commands that have previously been set by the makers are obtained from the respective STBs before or after performing recognition of the STBs to create the switching disable command table, and the selector 210 does not perform switching when the remote control code outputted from the remote controller includes a switching disable command on the switching disable command table. Therefore, useless operation is avoided when performing remote control operation in which switching of the display screen is not required, such as recording, fast forward, or fast reverse.

While in the eleventh and twelfth embodiments switching of the display screen is avoided using the switching disable command, a switching enable command table as shown in FIG. 36 may be created to switch the display screen using a switching enable command. Thereby, the display screen can be automatically switched when executing playback, fast-forward playback, or fast-reverse playback.

The AV system according to the present invention is useful as an AV system capable of performing remote control operation aiming at a display when a video device such as an STB, DVD, or VTR is connected to the display.

What is claimed is:

1. An audio visual system comprising:
a display unit having a display section;
a plurality of video devices connected to the display unit; and
a plurality of remote controllers for controlling the respective video devices,
wherein a remote controller of the plurality of remote controllers transmits a remote control code to the display unit,
wherein, upon the remote control code being received by the display unit, the display unit (1) determines one of the plurality of video devices which corresponds to the remote controller, (2) transmits the remote control code to the one of the video devices determined to correspond to the remote controller, (3) extracts a command from the remote control code, and (4) determines whether the extracted command is a switching disable command or a switching enable command,
wherein, if the display unit determines that the extracted command is a switching enable command, the display unit connects the one of the video devices determined to correspond to the remote controller to the display section of the display unit, and
wherein, if the display unit determines that the extracted command is a switching disable command, the display unit does not switch a connection between the video devices and the display section of the display unit, and video data being displayed on the display section of the display unit is not required to change.

2. An audio visual system as defined in claim 1, wherein each of the plurality of video devices has one or more switching enable commands, and
the display unit obtains the one or more switching enable commands from each of the plurality of video devices and creates a switching enable command table, and connects the video device corresponding to the remote controller to the display section when the command extracted from remote control code includes a switching enable command that is included in the switching enable command table.

3. An audio visual system as defined in claim 1, wherein each of the plurality of video devices has at least one of maker ID information and device ID information, and transmits the maker ID information or the device ID information to the display unit after being connected to the display unit, and the display unit creates a connected-device table on the basis of the maker ID information or the device ID information transmitted from each of the plurality of video devices, and identifies the video device corresponding to the remote controller from the connected-device table using at least one of the maker ID information and the device ID information that is included in the remote control code outputted from the remote controller.

4. An audio visual system as defined in claim 1, wherein each of the plurality of video devices has at least one of a vender ID and a device address, and transmits the vender ID or the device address to the display unit after being connected to the display unit, and the display unit has at least one of maker ID information corresponding to vender IDs and device ID information corresponding to device addresses, creates a connected-device table on the basis of the vender IDs or the device addresses transmitted from each of the plurality of video devices, and identifies the video device corresponding to the remote controller from the connected-device table using at least one of the maker ID information and the device ID information that is included in the remote control code outputted from the remote controller.

5. An audio visual system as defined in claim 1, wherein an interface means for connecting the display unit and the plurality of video devices is a digital interface.

6. An audio visual system as defined in claim 1, wherein an interface means for connecting the display unit and the plurality of video devices is HDMI or DVI.

7. An audio visual system comprising:
a display unit having a display section;
a plurality of video devices connected to the display unit; and
a plurality of remote controllers for controlling the respective video devices,
wherein a remote controller of the plurality of remote controllers transmits a remote control code to the display unit,
wherein, upon the remote control code being received by the display unit, the display unit (1) determines one of the plurality of video devices which corresponds to the remote controller, (2) transmits the remote control code to the one of the video devices determined to correspond to the remote controller, (3) extracts a command from the remote control code, and (4) compares the extracted command to one or more stored switching disable commands and switching enable commands,
wherein, if the display unit determines that the extracted command corresponds to one of the one or more stored switching enable commands, the display unit connects the one of the video devices determined to correspond to the remote controller to the display section of the display unit, and
wherein, if the display unit determines that the extracted command corresponds to one of the one or more stored switching disable commands, the display unit does not switch a connection between the video devices and the display section of the display unit, and video data being displayed on the display section of the display unit is not required to change.

8. An audio visual system as defined in claim 7, wherein each of the plurality of video devices has one or more switching enable commands, and
the display unit obtains the one or more switching enable commands from each of the plurality of video devices and creates a switching enable command table, and connects the video device corresponding to the remote controller to the display section when the command extracted from remote control code includes a switching enable command that is included in the switching enable command table.

9. An audio visual system as defined in claim 7, wherein each of the plurality of video devices has at least one of maker ID information and device ID information, and transmits the maker ID information or the device ID information to the display unit after being connected to the display unit, and the display unit creates a connected-device table on the basis of the maker ID information or the device ID information transmitted from each of the plurality of video devices, and identifies the video device corresponding to the remote controller from the connected-device table using at least one of the maker ID information and the device ID information that is included in the remote control code outputted from the remote controller.

10. An audio visual system as defined in claim 7, wherein each of the plurality of video devices has at least one of a vender ID and a device address, and transmits the vender ID or the device address to the display unit after being connected to the display unit, and the display unit has at least one of maker ID information corresponding to vender IDs and device ID information corresponding to device addresses, creates a connected-device table on the basis of the vender IDs or the device addresses transmitted from each of the plurality of video devices, and identifies the video device corresponding to the remote controller from the connected-device table using at least one of the maker ID information and the device ID information that is included in the remote control code outputted from the remote controller.

11. An audio visual system as defined in claim 7, wherein an interface means for connecting the display unit and the plurality of video devices is a digital interface.

12. An audio visual system as defined in claim 7, wherein an interface means for connecting the display unit and the plurality of video devices is HDMI or DVI.

13. An audio visual system comprising:
a display unit;
a plurality of video devices connected to the display unit; and
a plurality of remote controllers for controlling the respective video devices,
wherein the display unit comprises a controller, a selector, and a display section connected to the selector,
wherein a remote controller of the plurality of remote controllers transmits a remote control code to the display unit,
wherein, upon the remote control code being received by the display unit, the controller (1) determines one of the plurality of video devices which corresponds to the remote controller, (2) transmits the remote control code to the one of the video devices determined to correspond to the remote controller, (3) extracts a command from the remote control code, and (4) determines whether the extracted command is a switching disable command or a switching enable command,
wherein, if the controller determines that the extracted command is a switching enable command, the controller sends a switching signal to the selector instructing the selector to perform a switching operation so as to connect the one of the video devices determined to correspond to the remote controller to the display section of the display unit, and wherein, if the controller determines that the extracted command is a switching disable command, the controller does not send a switching signal to the selector, and video data being displayed on the display section of the display unit is not required to change.

14. An audio visual system as defined in claim 13, wherein each of the plurality of video devices has one or more switching enable commands, and the display unit obtains the one or more switching enable commands from each of the plurality of video devices and creates a switching enable command table, and connects the video device corresponding to the remote controller to the display section when the command extracted from remote control code includes a switching enable command that is included in the switching enable command table.

15. An audio visual system as defined in claim 13, wherein each of the plurality of video devices has at least one of maker ID information and device ID information, and transmits the maker ID information or the device ID information to the display unit after being connected to the display unit, and the display unit creates a connected-device table on the basis of the maker ID information or the device ID information transmitted from each of the plurality of video devices, and identifies the video device corresponding to the remote controller from the connected-device table using at least one of the maker ID information and the device ID information that is included in the remote control code outputted from the remote controller.

16. An audio visual system as defined in claim 13, wherein each of the plurality of video devices has at least one of a vender ID and a device address, and transmits the vender ID or the device address to the display unit after being connected to the display unit, and the display unit has at least one of maker ID information corresponding to vender IDs and device ID information corresponding to device addresses, creates a connected-device table on the basis of the vender IDs or the device addresses transmitted from each of the plurality of video devices, and identifies the video device corresponding to the remote controller from the connected-device table using at least one of the maker ID information and the device ID information that is included in the remote control code outputted from the remote controller.

17. An audio visual system as defined in claim 13, wherein an interface means for connecting the display unit and the plurality of video devices is a digital interface.

18. An audio visual system as defined in claim 13, wherein an interface means for connecting the display unit and the plurality of video devices is HDMI or DVI.

19. An audio visual system comprising:
a display unit;
a plurality of video devices connected to the display unit; and
a plurality of remote controllers for controlling the respective video devices,
wherein the display unit comprises a controller, a selector, and a display section connected to the selector,
wherein a remote controller of the plurality of remote controllers transmits a remote control code to the display unit, wherein, upon the remote control code being received by the display unit, the controller (1) determines one of the plurality of video devices which corresponds to the remote controller, (2) transmits the remote control code to the one of the video devices determined to correspond to the remote controller, (3) extracts a command from the remote control code, and (4) compares the extracted command to one or more stored switching disable commands and switching enable commands, wherein, if the controller determines that the extracted command corresponds to one of the one or more stored switching enable commands, the controller sends a switching signal to the selector instructing the selector to perform a switching operation so as to connect the one of the video devices determined to correspond to the remote controller to the display section of the display unit, and wherein, if the controller determines that the extracted command corresponds to one of the one or more stored switching disable commands, the controller does not send a switching signal to the selector, and video data being displayed on the display section of the display unit is not required to change.

20. An audio visual system as defined in claim 19, wherein each of the plurality of video devices has one or more switching enable commands, and the display unit obtains the one or more switching enable commands from each of the plurality of video devices and creates a switching enable command table, and connects the video device corresponding to the remote controller to the display section when the command extracted from remote control code includes a switching enable command that is included in the switching enable command table.

21. An audio visual system as defined in claim 19, wherein each of the plurality of video devices has at least one of maker ID information and device ID information, and transmits the maker ID information or the device ID information to the display unit after being connected to the display unit, and the display unit creates a connected-device table on the basis of the maker ID information or the device ID information transmitted from each of the plurality of video devices, and identifies the video device corresponding to the remote controller from the connected-device table using at least one of the maker ID information and the device ID information that is included in the remote control code outputted from the remote controller.

22. An audio visual system as defined in claim 19, wherein each of the plurality of video devices has at least one of a vender ID and a device address, and transmits the vender ID or the device address to the display unit after being connected to the display unit, and the display unit has at least one of maker ID information corresponding to vender IDs and device ID information corresponding to device addresses, creates a connected-device table on the basis of the vender IDs or the device addresses transmitted from each of the plurality of video devices, and identifies the video device corresponding to the remote controller from the connected-device table using at least one of the maker ID information and the device ID information that is included in the remote control code outputted from the remote controller.

23. An audio visual system as defined in claim 19, wherein an interface means for connecting the display unit and the plurality of video devices is a digital interface.

24. An audio visual system as defined in claim 19, wherein an interface means for connecting the display unit and the plurality of video devices is HDMI or DVI.

* * * * *